United States Patent
Harris et al.

(10) Patent No.: US 10,523,768 B2
(45) Date of Patent: *Dec. 31, 2019

(54) SYSTEM AND METHOD FOR GENERATING, ACCESSING, AND UPDATING GEOFEEDS

(71) Applicant: TAI Technologies, Inc., Naples, FL (US)

(72) Inventors: Philip B. Harris, Naples, FL (US); Scott K. Mitchell, Naples, FL (US); Michael J. Mulroy, Glencoe, IL (US)

(73) Assignee: TAI Technologies, Inc., Naples, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/733,715

(22) Filed: Jun. 8, 2015

(65) Prior Publication Data
US 2016/0014219 A1    Jan. 14, 2016

Related U.S. Application Data

(63) Continuation of application No. 14/089,631, filed on Nov. 25, 2013, now Pat. No. 9,055,074, which is a
(Continued)

(51) Int. Cl.
*H04L 29/08* (2006.01)
*G06F 16/958* (2019.01)
*G06F 16/9537* (2019.01)

(52) U.S. Cl.
CPC ............ *H04L 67/18* (2013.01); *G06F 16/958* (2019.01); *G06F 16/9537* (2019.01); *H04L 67/10* (2013.01); *H04L 67/26* (2013.01)

(58) Field of Classification Search
CPC .......... G06F 17/3087; G06F 17/30241; G06F 17/30864; G06F 17/3005; G06F 17/30522;
(Continued)

(56) References Cited

U.S. PATENT DOCUMENTS

| | | |
|---|---|---|
| 5,317,680 A | 5/1994 | Ditter, Jr. |
| 6,026,368 A | 2/2000 | Brown |

(Continued)

FOREIGN PATENT DOCUMENTS

| | | |
|---|---|---|
| EP | 1 045 345 | 10/2000 |
| EP | 2187594 A1 | 5/2010 |

(Continued)

OTHER PUBLICATIONS

U.S. Appl. No. 13/788,843, a Notice of Allowance issued by Examiner, dated Dec. 3, 2015, 18 pages.
(Continued)

*Primary Examiner* — Djenane M Bayard
(74) *Attorney, Agent, or Firm* — Sheppard Mullin Richter & Hampton LLP

(57) ABSTRACT

A system and method for generating a geofeed is provided. A geofeed includes a collection of content, aggregated from various content providers, that is relevant to one or more geographically definable locations. The generated content may include, for example, video, audio, images, text, hyperlinks, and/or other content that may be relevant to a geographically definable location. The content providers may include, for example, social media platforms, online knowledge databases, individual content creators, and/or other providers that can distribute content that may be relevant to a geographically definable location. The geographically definable location may be specified by a boundary, geo coordinates, an address, a place name, a point of interest, a zip code, and/or other information that can spatially identify an area. The geofeed may be presented via an interface that spatially arranges the content according to a geo-location related to the content and/or for integration with other data collection systems.

26 Claims, 7 Drawing Sheets

Related U.S. Application Data continuation of application No. 13/619,888, filed on Sep. 14, 2012, now Pat. No. 8,595,317.

(58) Field of Classification Search
CPC ........ G06F 17/30554; G06F 17/30943; G06Q 50/01; G06Q 30/0261; G06Q 30/0269; G06Q 30/0621; G06Q 30/0639; G06Q 30/0256; G06Q 30/0257; H04L 67/22; H04L 67/306; H04L 67/02; H04L 67/42; H04L 67/10; H04L 63/10; H04L 67/2838; H04L 63/08; H04L 63/20; H04L 65/4084; H04L 67/2823; H04L 2209/80; H04L 65/1016; H04L 65/4076; H04L 9/0643; H04L 2012/2849; H04L 2209/12; H04L 2209/24; H04L 29/06; H04W 48/04; H04W 4/02; H04W 4/021

See application file for complete search history.

(56) References Cited

U.S. PATENT DOCUMENTS

| | | | |
|---|---|---|---|
| 6,128,655 A | 10/2000 | Fields | |
| 6,345,256 B1 | 2/2002 | Milsted | |
| 6,363,320 B1 | 3/2002 | Chou | 701/207 |
| 7,076,737 B2 | 7/2006 | Abbott | |
| 7,522,940 B2 | 4/2009 | Jendbro et al. | 455/566 |
| 7,680,796 B2 | 3/2010 | Yeh | |
| 7,698,336 B2 | 4/2010 | Nath | 707/737 |
| 7,912,451 B2 | 3/2011 | Eckhart | 455/410 |
| 7,974,983 B2 | 7/2011 | Goeldi | |
| 8,103,741 B2 | 1/2012 | Frazier et al. | 709/217 |
| 8,341,223 B1 | 12/2012 | Patton et al. | 709/204 |
| 8,428,228 B1 | 4/2013 | Baxter, Jr. | 379/88.14 |
| 8,484,224 B1 | 7/2013 | Harris et al. | 707/748 |
| 8,595,317 B1 | 11/2013 | Harris et al. | 709/213 |
| 8,612,533 B1 | 12/2013 | Harris et al. | 709/206 |
| 8,639,767 B1 | 1/2014 | Harris et al. | 709/207 |
| 8,655,873 B2 | 2/2014 | Mitchell et al. | 707/724 |
| 8,655,983 B1 | 2/2014 | Harris et al. | 709/217 |
| 8,812,951 B1 | 8/2014 | White | |
| 8,843,515 B2 | 9/2014 | Burris | 707/769 |
| 8,849,935 B1 | 9/2014 | Harris et al. | 709/206 |
| 8,850,531 B1 | 9/2014 | Harris et al. | 726/4 |
| 8,862,589 B2 | 10/2014 | Harris et al. | 707/743 |
| 9,055,074 B2 | 6/2015 | Harris | |
| 9,077,675 B2 | 7/2015 | Harris | |
| 9,077,782 B2 | 7/2015 | Harris | |
| 9,258,373 B2 | 2/2016 | Harris | |
| 9,307,353 B2 | 4/2016 | Harris | |
| 9,317,600 B2 | 4/2016 | Harris | |
| 9,369,533 B2 | 6/2016 | Harris | |
| 9,436,690 B2 | 9/2016 | Harris | |
| 9,443,090 B2 | 9/2016 | Harris | |
| 9,479,557 B2 | 10/2016 | Harris | |
| 9,485,318 B1 | 11/2016 | Harris | |
| 9,497,275 B2 | 11/2016 | Harris | |
| 9,619,489 B2 | 4/2017 | Harris | |
| 2002/0029226 A1 | 3/2002 | Li et al. | 707/104.1 |
| 2002/0029384 A1 | 3/2002 | Griggs | |
| 2002/0128908 A1 | 9/2002 | Levin | |
| 2002/0188669 A1 | 12/2002 | Levine | |
| 2003/0018607 A1 | 1/2003 | Lennon | |
| 2003/0025832 A1 | 2/2003 | Swart | |
| 2003/0040971 A1 | 2/2003 | Freedenberg | |
| 2003/0088609 A1 | 5/2003 | Guedalia et al. | 709/107 |
| 2003/0148771 A1 | 8/2003 | De Verteuil | |
| 2004/0203854 A1 | 10/2004 | Nowak | 455/456.1 |
| 2004/0205585 A1 | 10/2004 | McConnell | |
| 2004/0225635 A1 | 11/2004 | Toyama et al. | 707/1 |
| 2005/0015216 A1 | 1/2005 | Kothuri | |
| 2005/0034074 A1 | 2/2005 | Munson et al. | 715/712 |
| 2005/0107948 A1 | 5/2005 | Catalinotto | |
| 2005/0278378 A1 | 12/2005 | Frank | |
| 2006/0002317 A1 | 1/2006 | Punaganti Venkata | 370/310 |
| 2006/0059227 A1 | 3/2006 | Zimler | |
| 2006/0106778 A1* | 5/2006 | Baldwin | G06F 17/3087 |
| 2006/0184968 A1 | 8/2006 | Clayton et al. | 725/56 |
| 2006/0200305 A1 | 9/2006 | Sheha et al. | 701/200 |
| 2006/0271281 A1 | 11/2006 | Ahn | |
| 2007/0112729 A1 | 5/2007 | Wiseman et al. | 707/3 |
| 2007/0121843 A1 | 5/2007 | Atazky et al. | 379/114.13 |
| 2007/0143345 A1 | 6/2007 | Jones et al. | 707/104.1 |
| 2007/0210937 A1 | 9/2007 | Smith et al. | 340/995.1 |
| 2007/0276919 A1 | 11/2007 | Buchmann et al. | 709/217 |
| 2007/0294299 A1 | 12/2007 | Goldstein | |
| 2008/0092054 A1 | 4/2008 | Bhumkar et al. | 715/739 |
| 2008/0104019 A1 | 5/2008 | Nath | 707/3 |
| 2008/0147674 A1 | 6/2008 | Nandiwada | |
| 2008/0189099 A1 | 8/2008 | Friedman | |
| 2008/0192934 A1 | 8/2008 | Nelger et al. | 380/258 |
| 2008/0250031 A1 | 10/2008 | Ting et al. | 707/100 |
| 2009/0005968 A1 | 1/2009 | Vengroff et al. | 701/202 |
| 2009/0102859 A1 | 4/2009 | Athsani et al. | 345/619 |
| 2009/0132435 A1 | 5/2009 | Titus et al. | 705/400 |
| 2009/0138497 A1 | 5/2009 | Zavoli et al. | 707/102 |
| 2009/0210426 A1 | 8/2009 | Kulakov | |
| 2009/0217232 A1 | 8/2009 | Beerel et al. | 716/18 |
| 2009/0222482 A1* | 9/2009 | Klassen | G06F 17/30241 |
| 2009/0297118 A1 | 12/2009 | Fink | |
| 2009/0300528 A1 | 12/2009 | Stambaugh | 715/764 |
| 2010/0010907 A1 | 1/2010 | Dasgupta | |
| 2010/0030648 A1 | 2/2010 | Manolescu | |
| 2010/0076968 A1* | 3/2010 | Boyns | G06F 17/30241 707/732 |
| 2010/0079338 A1 | 4/2010 | Wooden | |
| 2010/0083124 A1* | 4/2010 | Druzgalski | G06F 17/3087 715/738 |
| 2010/0138553 A1 | 6/2010 | Yuan | |
| 2010/0145947 A1 | 6/2010 | Kolman et al. | 707/736 |
| 2010/0149399 A1 | 6/2010 | Mukai et al. | 348/333.02 |
| 2010/0153386 A1 | 6/2010 | Tysowski | 707/736 |
| 2010/0153410 A1 | 6/2010 | Jin et al. | 707/758 |
| 2010/0177120 A1 | 7/2010 | Balfour | 345/647 |
| 2010/0180001 A1 | 7/2010 | Hardt | 709/207 |
| 2011/0007941 A1 | 1/2011 | Chen et al. | 382/103 |
| 2011/0010674 A1 | 1/2011 | Knize et al. | 715/849 |
| 2011/0035284 A1* | 2/2011 | Moshfeghi | G06Q 30/02 705/14.58 |
| 2011/0040894 A1 | 2/2011 | Shrum | |
| 2011/0055176 A1 | 3/2011 | Choi | |
| 2011/0072106 A1 | 3/2011 | Hoffert | |
| 2011/0072114 A1 | 3/2011 | Hoffert | |
| 2011/0078584 A1 | 3/2011 | Winterstein et al. | 715/751 |
| 2011/0083013 A1 | 4/2011 | Nice et al. | 713/168 |
| 2011/0113096 A1 | 5/2011 | Long et al. | 709/204 |
| 2011/0123066 A9 | 5/2011 | Chen et al. | 382/103 |
| 2011/0131496 A1 | 6/2011 | Abram et al. | 715/722 |
| 2011/0137561 A1 | 6/2011 | Kankainen | 701/300 |
| 2011/0142347 A1 | 6/2011 | Chen et al. | 382/190 |
| 2011/0153368 A1 | 6/2011 | Pierre et al. | 705/4 |
| 2011/0218985 A1 | 9/2011 | Camper | |
| 2011/0227699 A1 | 9/2011 | Seth et al. | 340/8.1 |
| 2011/0250875 A1 | 10/2011 | Huang | |
| 2011/0270940 A1 | 11/2011 | Johnson et al. | 709/207 |
| 2011/0288917 A1 | 11/2011 | Wanek et al. | 705/14.5 |
| 2011/0307307 A1 | 12/2011 | Benmbarek | |
| 2012/0001938 A1 | 1/2012 | Sandberg | 345/633 |
| 2012/0047219 A1 | 2/2012 | Feng et al. | 709/207 |
| 2012/0077521 A1* | 3/2012 | Boldyrev | H04W 4/043 455/456.3 |
| 2012/0078503 A1 | 3/2012 | Dzubay et al. | 701/410 |
| 2012/0084323 A1 | 4/2012 | Epshtein et al. | 707/776 |
| 2012/0101880 A1 | 4/2012 | Alexander | |
| 2012/0102034 A1 | 4/2012 | Kim | |
| 2012/0109752 A1 | 5/2012 | Strutton | |
| 2012/0124161 A1 | 5/2012 | Tidwell | |
| 2012/0124630 A1 | 5/2012 | Wellen | |
| 2012/0150901 A1 | 6/2012 | Johnson et al. | 707/769 |
| 2012/0158536 A1 | 6/2012 | Gratton | |
| 2012/0166367 A1 | 6/2012 | Murdock et al. | 706/12 |
| 2012/0197963 A1 | 8/2012 | Bouw | |
| 2012/0200403 A1 | 8/2012 | Morris | |

(56) References Cited

U.S. PATENT DOCUMENTS

| | | |
|---|---|---|
| 2012/0209826 A1 | 8/2012 | Belimpasakis |
| 2012/0212398 A1 | 8/2012 | Border et al. ................. 345/8 |
| 2012/0221687 A1 | 8/2012 | Hunter et al. ............... 709/219 |
| 2012/0232939 A1 | 9/2012 | Pierre et al. ................... 705/4 |
| 2012/0233158 A1 | 9/2012 | Braginsky |
| 2012/0239763 A1 | 9/2012 | Musil |
| 2012/0254774 A1 | 10/2012 | Patton ........................ 715/758 |
| 2012/0259791 A1 | 10/2012 | Zoidze ........................ 705/319 |
| 2012/0276848 A1 | 11/2012 | Krattiger et al. ............ 455/41.2 |
| 2012/0276918 A1 | 11/2012 | Krattiger et al. .......... 455/456.1 |
| 2012/0317482 A1 | 12/2012 | Barraclough |
| 2012/0323687 A1 | 12/2012 | Schuster et al. ........... 705/14.57 |
| 2012/0330959 A1 | 12/2012 | Kretz et al. ................... 707/739 |
| 2013/0013713 A1 | 1/2013 | Shoham ........................ 709/206 |
| 2013/0018957 A1 | 1/2013 | Parnaby et al. ............. 709/204 |
| 2013/0051611 A1 | 2/2013 | Hicks ........................... 382/103 |
| 2013/0054672 A1 | 2/2013 | Stilling |
| 2013/0060744 A1* | 3/2013 | Roychoudhuri .. G06F 17/30867 707/706 |
| 2013/0060796 A1 | 3/2013 | Gilg |
| 2013/0073336 A1 | 3/2013 | Heath |
| 2013/0073388 A1 | 3/2013 | Heath ........................ 705/14.53 |
| 2013/0073389 A1 | 3/2013 | Heath |
| 2013/0073631 A1 | 3/2013 | Patton et al. ................. 709/204 |
| 2013/0110631 A1 | 5/2013 | Mitchell et al. ........... 705/14.58 |
| 2013/0110641 A1 | 5/2013 | Ormont |
| 2013/0124437 A1 | 5/2013 | Pennacchiotti |
| 2013/0124634 A1 | 5/2013 | Weinstein |
| 2013/0131918 A1 | 5/2013 | Hahne |
| 2013/0132194 A1 | 5/2013 | Rajaram |
| 2013/0150015 A1 | 6/2013 | Valko et al. ................... 455/418 |
| 2013/0159463 A1 | 6/2013 | Bentley et al. ............... 709/217 |
| 2013/0159519 A1 | 6/2013 | Hochberg |
| 2013/0169673 A1 | 7/2013 | Garrett |
| 2013/0201182 A1 | 8/2013 | Kuroki et al. ................ 345/419 |
| 2013/0204886 A1* | 8/2013 | Faith ................. G06Q 30/0631 707/756 |
| 2013/0238599 A1 | 9/2013 | Burris .......................... 707/722 |
| 2013/0238652 A1 | 9/2013 | Burris .......................... 707/769 |
| 2013/0238658 A1 | 9/2013 | Burris .......................... 707/770 |
| 2013/0262168 A1 | 10/2013 | Makanawala |
| 2013/0263019 A1 | 10/2013 | Castellanos |
| 2013/0268558 A1 | 10/2013 | Burris .......................... 707/770 |
| 2013/0290207 A1 | 10/2013 | Bonmassar |
| 2013/0290554 A1 | 10/2013 | Chen |
| 2013/0317975 A1* | 11/2013 | Gage ................. G06Q 30/0601 705/39 |
| 2013/0325964 A1* | 12/2013 | Berberat ................ H04L 67/18 709/204 |
| 2013/0337767 A1 | 12/2013 | Siomina |
| 2013/0346563 A1 | 12/2013 | Huang ........................ 709/219 |
| 2014/0019443 A1* | 1/2014 | Golshan ............. G06F 16/9535 707/723 |
| 2014/0020034 A1* | 1/2014 | Manchester ..... H04N 21/23439 725/86 |
| 2014/0025911 A1 | 1/2014 | Sims |
| 2014/0040371 A1 | 2/2014 | Gurevich |
| 2014/0089296 A1 | 3/2014 | Burris .......................... 707/722 |
| 2014/0089343 A1 | 3/2014 | Burris et al. ................. 707/770 |
| 2014/0089461 A1 | 3/2014 | Harris et al. ................. 709/217 |
| 2014/0095509 A1 | 4/2014 | Patton .......................... 707/740 |
| 2014/0143346 A1 | 5/2014 | Mahmud |
| 2014/0162692 A1 | 6/2014 | Li |
| 2014/0164368 A1 | 6/2014 | Mitchell et al. .............. 707/724 |
| 2014/0189524 A1 | 7/2014 | Murarka |
| 2014/0189539 A1 | 7/2014 | St Clair |
| 2014/0195918 A1 | 7/2014 | Friedlander |
| 2014/0207893 A1 | 7/2014 | Harris et al. ................. 709/207 |
| 2014/0222950 A1 | 8/2014 | Rabel |
| 2014/0236882 A1 | 8/2014 | Rishe |
| 2014/0256355 A1 | 9/2014 | Harris et al. ................ 455/456.3 |
| 2014/0258451 A1 | 9/2014 | Harris et al. ................. 709/217 |
| 2014/0259113 A1 | 9/2014 | Harris et al. ..................... 726/4 |
| 2014/0274148 A1 | 9/2014 | Harris et al. ................ 455/456.3 |
| 2014/0280103 A1 | 9/2014 | Harris et al. .................. 707/724 |
| 2014/0280278 A1 | 9/2014 | Harris et al. .................. 707/758 |
| 2014/0280569 A1 | 9/2014 | Harris et al. .................. 709/204 |
| 2014/0297740 A1 | 10/2014 | Narayanan |
| 2015/0019866 A1 | 1/2015 | Braness |
| 2015/0026721 A1 | 1/2015 | Feng |
| 2015/0169142 A1 | 6/2015 | Longo |
| 2015/0169694 A1 | 6/2015 | Longo |
| 2015/0172396 A1 | 6/2015 | Longo |
| 2015/0256632 A1 | 9/2015 | Harris |
| 2015/0381380 A1 | 12/2015 | Harris |
| 2016/0006783 A1 | 1/2016 | Harris |
| 2016/0182656 A1 | 6/2016 | Harris |
| 2016/0219403 A1 | 7/2016 | Harris |
| 2016/0232182 A1 | 8/2016 | Harris |
| 2016/0283561 A1 | 9/2016 | Harris |
| 2017/0032384 A1 | 2/2017 | Harris |
| 2017/0041365 A1 | 2/2017 | Harris |
| 2017/0046355 A1 | 2/2017 | Harris |
| 2017/0064017 A1 | 3/2017 | Harris |
| 2019/0036866 A1 | 1/2019 | Iseminger |

FOREIGN PATENT DOCUMENTS

| | | |
|---|---|---|
| EP | 2293566 A2 | 3/2011 |
| WO | WO 99/15995 | 4/1999 |
| WO | 2009155741 A1 | 12/2009 |
| WO | WO 2010/049918 | 5/2010 |
| WO | 2012174650 | 12/2012 |
| WO | WO 2013/133870 | 9/2013 |
| WO | WO 2013/134451 | 9/2013 |

OTHER PUBLICATIONS

U.S. Appl. No. 14/500,881, a non-final Office Action issued by Examiner, dated Dec. 21, 2015, 24 pages.

U.S. Appl. No. 14/512,293, a non-final Office Action issued by Examiner, dated Dec. 9, 2015, 14 pages.

U.S. Appl. No. 14/666,056, a Final Office Action issued by Examiner, dated Jan. 4, 2016, 11 pages.

U.S. Appl. No. 14/813,031, a non-final Office Action issued by Examiner, dated Nov. 24, 2015, 23 pages.

U.S. Appl. No. 14/813,039, a non-final Office Action issued by Examiner, dated Jan. 20, 2016, 20 pages.

U.S. Appl. No. 13/284,455, a non-final Office Action issued by Examiner, dated Jan. 7, 2013, 18 pages.

U.S. Appl. No. 13/619,888, a non-final Office Action issued by Examiner, dated Mar. 1, 2013, 15 pages.

U.S. Appl. No. 13/708,466, a non-final Office Action issued by Examiner, dated Apr. 17, 2013, 15 pages.

U.S. Appl. No. 13/708,516, a non-final Office Action issued by Examiner, dated May 15, 2013, 11 pages.

U.S. Appl. No. 13/708,404, a Notice of Allowance issued by Examiner, dated May 24, 2013, 12 pages.

U.S. Appl. No. 13/284,455, a non-final Office Action issued by Examiner, dated Jun. 4, 2013, 28 pages.

U.S. Appl. No. 13/708,516, a Notice of Allowance issued by Examiner, dated Jun. 7, 2013, 14 pages.

U.S. Appl. No. 13/619,888, a Notice of Allowance issued by Examiner, dated Jul. 9, 2013, 10 pages.

U.S. Appl. No. 13/788,760, a Notice of Allowance issued by Examiner, dated Jul. 26, 2013, 12 pages.

U.S. Appl. No. 13/788,843, a non-final Office Action issued by Examiner, dated Aug. 5, 2013, 17 pages.

U.S. Appl. No. 13/788,909, a non-final Office Action issued by Examiner, dated Aug. 12, 2013, 17 pages.

U.S. Appl. No. 13/843,949, a non-final Office Action issued by Examiner, dated Aug. 29, 2013, 12 pages.

U.S. Appl. No. 13/708,466, a Notice of Allowance issued by Examiner, dated Sep. 3, 2013, 11 pages.

U.S. Appl. No. 13/843,832, a non-final Office Action issued by Examiner, dated Sep. 13, 2013, 12 pages.

U.S. Appl. No. 13/284,455, a Notice of Allowance issued by Examiner, dated Oct. 4, 2013, 17 pages.

(56) References Cited

OTHER PUBLICATIONS

U.S. Appl. No. 13/788,843, a final Office Action issued by Examiner, dated Jan. 21, 2014, 25 pages.
U.S. Appl. No. 13/843,832, a Notice of Allowance issued by Examiner, dated Jan. 24, 2014, 6 pages.
U.S. Appl. No. 13/788,909, a Notice of Allowance issued by Examiner, dated Jan. 24, 2014, 12 pages.
U.S. Appl. No. 13/843,949, a Notice of Allowance issued by Examiner, dated Feb. 3, 2014, 11 pages.
U.S. Appl. No. 13/843,949, a Notice of Allowance issued by Examiner, dated May 9, 2014, 10 pages.
U.S. Appl. No. 13/843,832, a Notice of Allowance issued by Examiner, dated May 20, 2014, 7 pages.
U.S. Appl. No. 13/788,909, a Notice of Allowance issued by Examiner, dated Jun. 24, 2014, 11 pages.
U.S. Appl. No. 14/089,631, a non-final Office Action issued by Examiner, dated Jul. 8, 2014, 21 pages.
U.S. Appl. No. 14/180,473, a non-final Office Action issued by Examiner, dated Jul. 8, 2014, 18 pages.
U.S. Appl. No. 14/215,612, a non-final Office Action issued by Examiner, dated Jul. 11, 2014, 16 pages.
U.S. Appl. No. 14/108,301, a non-final Office Action issued by Examiner, dated Sep. 11, 2014, 10 pages.
U.S. Appl. No. 14/164,362, a non-final Office Action issued by Examiner, dated Oct. 23, 2014, 15 pages.
U.S. Appl. No. 14/180,845, a non-final Office Action issued by Examiner, dated Oct. 23, 2014, 32 pages.
U.S. Appl. No. 14/215,612, a final Office Action issued by Examiner, dated Nov. 28, 2014, 31 pages.
U.S. Appl. No. 14/089,631, a final Office Action issued by Examiner, dated Jan. 2, 2015, 8 pages.
U.S. Appl. No. 14/180,473, a final Office Action issued by Examiner, dated Jan. 5, 2015, 7 pages.
U.S. Appl. No. 14/089,631, a Notice of Allowance issued by Examiner, dated Feb. 2, 2015, 10 pages.
U.S. Appl. No. 14/500,832, a non-final Office Action issued by Examiner, dated May 21, 2015, 13 pages.
Chow et al., "Towards Location-Based Social Networking Services", LBSN 2010 Proceedings of the 2nd ACM SIGSPATIAL International Workshop on Location Based Social Networks, Nov. 2, 2010, pp. 31-38.
Bao, Jie, et al., "GeoFeed: A Location-Aware News Feed System", IEEE Xplore® Digital Library, Published in 2012 IEEE 28th International Conference on Data Engineering, Apr. 1-5, 2012, 14 pages.
Sarwat, Mohamed, et al., "Sindbad: A Location-Based Social Networking System", SIGMOD '12, Scottsdale, Arizona, May 20-24, 2012, 4 pages.
Amitay et al., "Web-a-Where: Geotagging Web Content", Proceedings of the 27th Annual International ACM SIGIR Conference on Research and Development in Information Retrieval (SIGIR), 2004, pp. 273-280.
Lee et al., "Tag-Geotag Correlation in Social Networks", Proceedings of the 2008 ACM Workshop on Search in Social Media, 2008, pp. 59-66.
U.S. Appl. No. 14/500,881, a non-final Office Action issued by Examiner, dated Sep. 21, 2015, 5 pages.
U.S. Appl. No. 14/180,845, a non-final Office Action issued by Examiner, dated Aug. 27, 2015, 43 pages.
U.S. Appl. No. 14/215,612, a non-final Office Action issued by Examiner, dated Aug. 18, 2015, 27 pages.
U.S. Appl. No. 14/512,293, a final Office Action issued by Examiner, dated Aug. 14, 2015, 15 pages.
U.S. Appl. No. 14/666,056, a non-final Office Action issued by Examiner, dated Aug. 10, 2015, 17 pages.
U.S. Appl. No. 14/180,845, a final Office Action issued by Examiner, dated Feb. 22, 2016, 43 pages.
U.S. Appl. No. 14/512,293, a Final Office Action issued by Examiner, dated Apr. 6, 2016, 9 pages.
U.S. Appl. No. 14/792,538, a non-final Office Action issued by Examiner, dated Feb. 26, 2016, 20 pages.
U.S. Appl. No. 14/813,031, a final Office Action issued by Examiner, dated Mar. 21, 2016, 41 pages.
U.S. Appl. No. 14/813,039, a Final Office Action issued by Examiner, dated May 16, 2016, 14 pages.
U.S. Appl. No. 15/241,836, a non-final Office Action issued by Examiner, dated Oct. 7, 2016, 38 pages.
U.S. Appl. No. 14/180,845, a non-final Office Action issued by Examiner, dated Jul. 7, 2016, 51 pages.
U.S. Appl. No. 14/813,031, a non-final Office Action issued by Examiner, dated Aug. 5, 2016, 46 pages.
U.S. Appl. No. 15/018,767, a non-final Office Action issued by Examiner, dated Jun. 6, 2016, 19 pages.
U.S. Appl. No. 15/130,289, a non-final Office Action issued by Examiner, dated Aug. 10, 2016, 42 pages.
Silberschatz et al. "Operating System Concepts, Eighth Edition", John Wiley & Sons, Jul. 29, 2008, ISBN-13: 978-0-470-12872-5, accessed Sep. 2018, 3 pages.

* cited by examiner

SYSTEM AND METHOD FOR GENERATING, ACCESSING, AND UPDATING GEOFEEDS

RELATED APPLICATIONS

This application is a continuation of granted U.S. patent application Ser. No. 14/089,631, filed Nov. 25, 2013, issued as U.S. Pat. No. 9,055,074 on Jun. 9, 2015, which claims the benefit of granted U.S. patent application Ser. No. 13/619,888, filed Sep. 14, 2012, issued as U.S. Pat. No. 8,595,317 on Nov. 26, 2013, both of which are incorporated by reference herein in their entireties.

FIELD OF THE INVENTION

The invention relates generally to generating geofeeds and more particularly to aggregating, from various providers, content relevant to one or more geographically definable locations and spatially organizing the aggregated content on a display.

BACKGROUND OF THE INVENTION

The availability of content such as videos, audio files, photos, and text over networks such as the Internet has grown at impressive rates. This growth has been fueled largely by the popularity of social media providers/platforms that register users, receive content from their users, and distribute the content to others. Put another way, users may be seen as content creators that publish their content through social media platforms. Other content creators publish content using their own websites and/or network-based exchanges and services such as online forums, chat rooms, and the like.

In many instances the created content can be automatically tagged with information such as user identifications, date/time information or geographic information that specifies a location where the content was created. For example, cameras equipped with Global Positioning Satellite ("GPS") units or other location-aware systems may embed into an image file latitude/longitude coordinates that indicate where a picture was taken. In addition, modern hand-held devices such as smartphones may be equipped with a GPS sensor, which allows users to generate content (text, photos and videos) with their devices and immediately share the content through a plurality of social networks. Moreover, some devices allow users to manually input the foregoing and other information for embedding into the content. Furthermore, editing software may allow a user to embed or otherwise associate information along with the content after the content was created.

Thus, various content available online may be tagged with both automatically and manually curated information that may be useful when parsing through the overwhelming amount of content that is available. In particular, because social media has become a real-time, instant data source, obtaining tags that indicate the geographic location where the content originated could be valuable across multiple markets, including news, marketing, first response, and others.

Conventional systems have been developed in an attempt to organize the content in a meaningful way. For example, various social media platforms expose Application Programming Interfaces that allow access to their data using various query parameters, including location parameters. However, conventional systems fail to leverage multiple sources of content such as different social media providers, websites, online exchanges, and knowledge databases. Conventional systems also fail to collect, aggregate, and present in a meaningful way the diversity of content.

As such, what is needed is to be able to collect and aggregate content from different providers of content such as social media platforms, websites, online exchanges, and knowledge database. What is further needed is to be able to search for social media by geography and present the aggregated content in a meaningful way that identifies the location of where the content originated. These and other problems exist.

SUMMARY OF THE INVENTION

The invention addressing these and other drawbacks relates to a system and method for creating and accessing geofeeds. A geofeed includes an integrated collection of content, aggregated from a predefined set of one or more content providers, that is relevant to one or more geographically definable locations. The aggregated content may include, for example, video, audio, images, text, hyperlinks, and/or other content that may be relevant to a geographically definable location. The system may create, store, update, and retrieve the geofeed. The system may also communicate a user interface that allows a content consumer to interact with the geofeed in various ways such as by providing multiple views of the geofeed. For example, the content consumer may manipulate the geofeed by showing, hiding, or sorting content from the geofeed based on a source of the content, a ranking of the content, and/or other criteria for modifying the view of the geofeed. The content consumer may also manipulate the presentation of the geofeed by switching between or combining a collage or grid-like view of the aggregated content, a map view that spatially arranges the aggregated content on a map, and a list view that shows a listing of the aggregated content. The content consumer may also choose to access the geofeed's content via an application programming interface ("API") provided by the Geofeed system for integration with other systems, including Geographic Information Systems ("GIS") applications, Customer Relationship Management ("CRM") systems, Content Management Systems ("CMS"), etc.

In some implementations, the system may include a computer that aggregates the content from the predefined set of content providers, which may include social media platforms, online knowledge databases, individual content creators, and/or other providers that can distribute content that may be relevant to a geographically definable location.

In some implementations, the computer may be programmed with computer program modules. The computer program modules may include a geofeed creation module, a geofeed retrieval module, a geofeed update module, a geofeed user interface module, and/or other modules.

The geofeed creation module may configure the computer to receive a request to create the geofeed. The request to create the geofeed may include a specification of one or more geographically definable locations (also referred to herein as the "geo-location") and one or more geofeed parameters such as, for example, providers to include (or exclude), types of content to include (or exclude), date ranges, content matching patterns, keywords, and/or other parameters that instruct the system as to which content should be included in the geofeed.

The geofeed creation module may include sub-modules that are used to create the geofeed based on the request. The sub-modules may format the request, receive content from the providers, format the received content, filter the received content, perform a data integrity check on the received content, and/or perform other processing to create the geofeed. For example, the sub-modules may include a pre-processing module, a post-processing module, a filtering module, an integrity checking module, and/or other modules.

The pre-processing module may configure the computer to format the request in order to be compatible with a format used by each of the predefined set of content providers. For example, a content provider may expose an API for accessing (e.g., request and/or receiving) its content. The API may require an input according to a particular format that may be different from the input format required from another API. For example and without limitation, a request to create a geofeed may include a geo-location specification that specifies an address for which to create the geofeed but the API may take as input a point and radius location. Yet another API may take as input a zip code. Another example is that of one or more boundaries that define the geo-location specification for a geofeed, and that geo-location specification may be transformed into point-and-radius or other boundaries as required by the provider APIs.

The pre-processing module may configure the computer to normalize the geo-location specification from the request to be compatible with both APIs. For example, the address may be normalized into a point that defines a geographic center of the address and a radius about the center in order to interface with the API that requires a point and radius as input. On the other hand, the address may be normalized into a zip code of which the address is a part in order to interface with the API that requests a zip code as input.

Some content providers may not expose an API. In these implementations, the pre-processing module may configure the computer to normalize the request to be compatible with the content provider even in the absence of an API. For example, the pre-processing module may configure the computer to request content from the content provider directly by crawling a website of the provider, executing search queries related to the provider on a search module and/or using other techniques to access content from the provider.

In some implementations, the pre-processing module may generate a geofeed definition that describes a geofeed such that a geofeed may be dynamically generated based on the geofeed definition. For example, the geofeed definition may include the geo-location specification, geofeed parameters, and/or other information related to the geofeed that can be used to aggregate content from various content providers. The geofeed definition may be identified by a geofeed identifier and stored for later retrieval so that a content consumer or others may select and obtain a geofeed that was previously defined.

The post-processing module may configure the computer to normalize the content and/or other descriptive information into a format that is compatible with the system. The content from the content providers may be provided in different formats and may include various meta-data and/or other descriptive information that describes the content. In some implementations, the content may include embedded data such as, for example, EXIF data. The post-processing module may configure the computer to extract the embedded data and normalize the extracted data as appropriate. In some implementations, the post-processing module may configure the computer to rank the received content. For example, a rank, or score, may be assigned to the received content based on various ranking factors such as, for example, relevance to a specified geo-location, content creator who created the content and other attributes about the creator such as influencer ranking, content provider who provided the content, and/or other factors that can be used to rank content.

In some implementations, the filtering module may configure the computer to filter the received content from the content providers by adding and/or removing particular ones of the received content. The filtered content may be added to and/or omitted from the geofeed. In some implementations, the content that is omitted from the geofeed may be stored in a memory so that the content consumer may be notified of such content. In some implementations, the filtering module may configure the computer to filter content based on a sensitivity of the received content. For example, the system may omit granular content that may be used to track a location of an individual content creator.

In some implementations, the integrity checking module may configure the computer to determine whether content includes potentially inaccurate information. Content that is associated with inaccurate information may be omitted and/or flagged. For example, the integrity checking module may configure the computer to determine whether a geo-location related to provided content is accurately reported by content providers. In particular, when content from a content creator (e.g., a social media user) is not automatically geo-tagged (e.g., by a GPS-enabled hand-held device), a particular content provider may use an address associated with the content creator to define a location of where the content was created.

The geofeed creation module may configure the computer to aggregate the received content, which may or may not be filtered and/or checked for potential data integrity problems, and generate a geofeed based on the aggregated content. In some implementations, the geofeed (e.g., content of the geofeed) may be stored. In these implementations, a stored geofeed may include only content that was aggregated at the time that the geofeed was created. The stored geofeed is different from a stored geofeed definition in that the stored geofeed includes only content (and/or links to content) aggregated at the time that the geofeed was created (e.g., has no new relevant content that may have been newly added since the geofeed was originally created/defined) while a geofeed definition may be used to dynamically aggregate content from providers that is currently available, which may include content that is available after the geofeed was originally defined.

The geofeed user interface module may configure the computer to communicate a user interface for receiving requests to create a geofeed, receiving requests to retrieve a previously created geofeed, and/or communicating the geofeed as described above with respect to manipulating views of a geofeed.

The geofeed retrieval module may configure the computer to receive a request to obtain a previously requested geofeed. The previously requested geofeed may be obtained in various ways.

In some implementations, a previously requested geofeed may be retrieved by obtaining a corresponding geofeed definition for the requested geofeed. In these implementations, the geofeed retrieval module may cause the geofeed creation module to dynamically aggregate content from the content providers that conforms to the geofeed definition. As such, the retrieved geofeed will include relevant content that was newly added since the previously requested geofeed was first created.

In some implementations, the previously requested geofeed may be retrieved from memory instead of being dynamically generated based on a geofeed definition. In these implementations, the retrieved geofeed will not include newly added relevant content since the geofeed was originally created (unless the geofeed was subsequently updated). In this manner, a content consumer may retrieve a previously created and stored geofeed as it existed when originally created. Also in these implementations, the geofeed update module may configure the computer to automatically (and/or based on user input) update the geofeed with newly available content. For example, new content from a content provider may become available after the geofeed was created. The geofeed update module may configure the computer to update the geofeed by including the newly available content with the content that was aggregated when the geofeed was created.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE INVENTION

Figure 1:
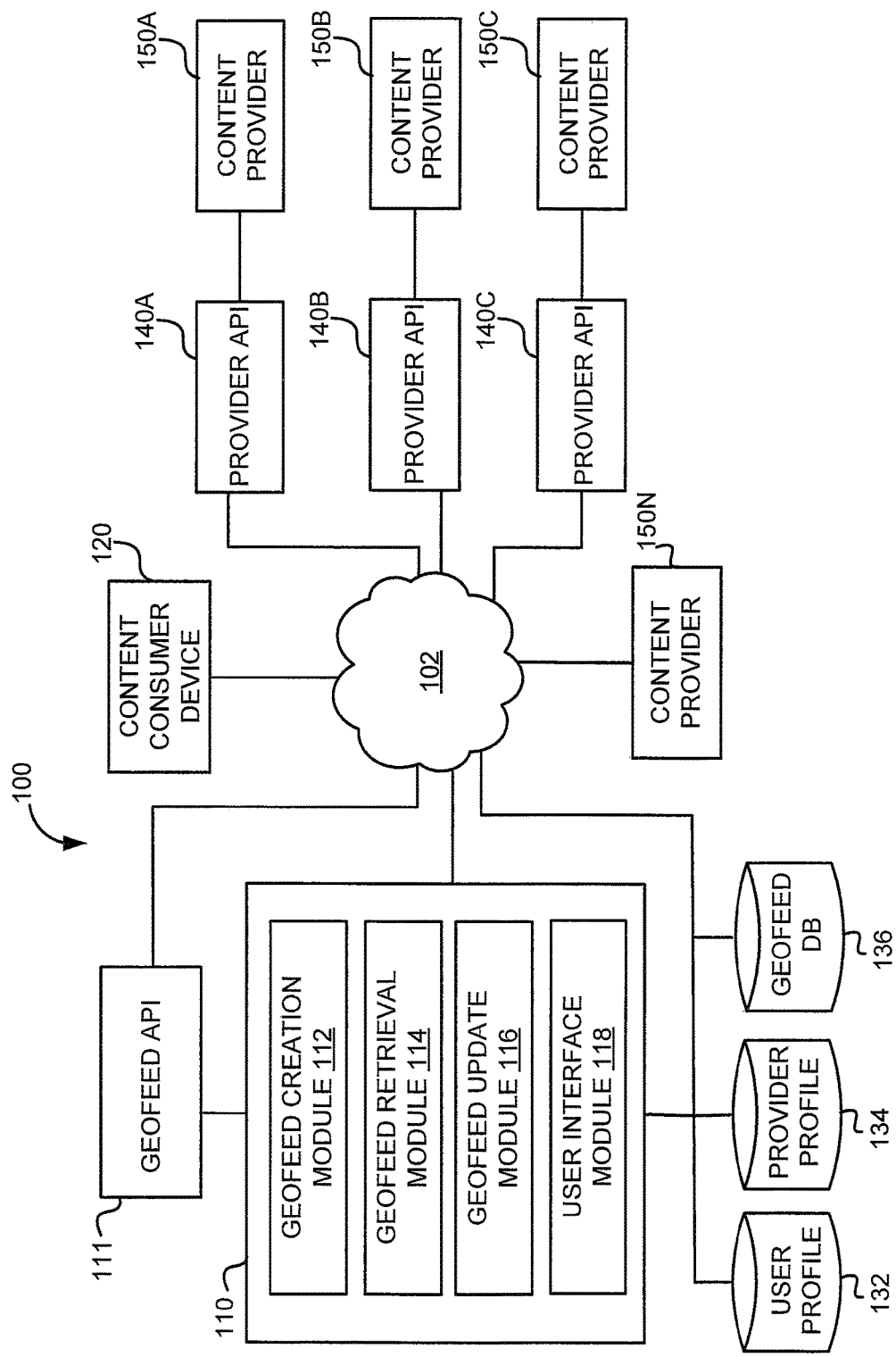
FIG. 1 illustrates a system of generating a geofeed, according to an aspect of the invention.

FIG. 1 illustrates a system 100 of generating, accessing, and storing a geofeed, according to an aspect of the invention. A geofeed includes a collection of content, aggregated from various content providers, that is relevant to a geographically definable location (hereinafter, a "geo-location"). As used hereinafter, "a location," "a geo-location," "a geographically definable location," and similar language is not limited to a single location but may also refer to one or more such locations. The generated content may include, for example, video, audio, images, text, hyperlinks, and/or other content that may be relevant to a geo-location. The content providers may include, for example, social media platforms, online knowledge databases, and/or other providers that can distribute content that may be relevant to a geo-location. The geo-location may be specified by a boundary, geo coordinates (e.g., latitude, longitude, altitude/depth), an address, a school, a place name, a point of interest, a zip code, a city, a state, a country, and/or other information that can spatially identify an area. The content may be generated by content sources such as individuals, corporations, and/or other entities that may create content.

Generally speaking, the system may obtain from content providers content that may be relevant to a geo-location. The system may relate content to the geo-location using various techniques such as, for example, using geotags embedded within or associated with the content, meta-data that describes the content, image recognition of the content to automatically determine a location, and/or other techniques. As used herein, the term "user" and "content consumer" can each refer to a single person, more than one person, and/or an entity such as a company or organization.

Using the system, a content consumer may specify a geo-location and obtain content from various social media platforms (e.g., FACEBOOK, TWITTER, INSTAGRAM, FLICKR, etc.) and/or other information providers. The user may also store a geofeed for later retrieval. Geofeeds may be used in various ways. For example, news providers may obtain real-time sources of content that may be localized to a geo-location, allowing for more complete coverage of a developing story and also targeting where reporters should be sent to further investigate. Marketers may obtain consumer sentiment and brand insights associated with their planned or existing products, services and/or physical locations as well as perform needs analysis for due diligence on potential future physical locations. First responders and disaster response teams may use geofeeds to obtain initial reports in order to direct responders to appropriate locations. Government agencies or others can perform situational awareness on a developing protest, riot, or other conflict.

The foregoing are merely examples of implementations and uses of the system. Other uses and implementations will now be described with respect to various system components.

Computer 110 may comprise one or more computing devices configured with various modules that enable the features and functions of the invention, as described in greater detail below. In some implementations, the computer may be programmed with computer program modules. The computer program modules may include a geofeed creation module 112, a geofeed retrieval module 114, a geofeed update module 116, a geofeed user interface module 118, and/or other modules.

The geofeed creation module 112 may program computer 110 to receive a request to create the geofeed. The request to create the geofeed may include a specification of one or more geographically definable locations (also referred to herein as the "geo-location") and one or more geofeed parameters such as, for example, providers to include (or exclude), types of content to include (or exclude), date ranges, content matching patterns, keywords, and/or other parameters that instruct the system as to which content should be included in the a geofeed.

In some embodiments, geofeed creation module 112 may stream a geofeed. The "stream" may include a geofeed that is updated and communicated in real-time. For example, the stream may include content that may be relevant to a geo-location that is continuously or otherwise regularly updated and provided to a content consumer and/or others. In these embodiments, geofeed creation module 112 may continuously or at regular intervals stream content that is relevant to a geo-location and complies with geofeed parameters (if any). In this manner, a content consumer may receive live streaming updates of a geofeed.

The geofeed creation module 112 may include sub-modules that are used to create the geofeed based on the request. The sub-modules may format the request, receive content from the providers, format the received content, filter the received content, perform a data integrity check on the received content, and/or perform other processing to create the geofeed. For example, the sub-modules may include a pre-processing module, a post-processing module, a filtering module, an integrity checking module, and/or other modules, as discussed below with respect to FIG. 2.

The geofeed retrieval module 114 may program the computer to receive a request to access a previously requested geofeed. The previously requested geofeed may be obtained in various ways.

In some implementations, a previously requested geofeed may be retrieved by obtaining a corresponding geofeed definition for the requested geofeed. In these implementations, geofeed retrieval module 114 cause geofeed creation module 112 to dynamically aggregate content from the content providers that conforms to the geofeed definition. As such, the retrieved geofeed may include relevant content that was newly added since the previously requested geofeed was first created.

In some implementations, the previously requested geofeed may be retrieved from memory such as geofeed database 136 instead of being dynamically generated based on a geofeed definition. In these implementations, the retrieved geofeed will not include newly added relevant content since the geofeed was originally created (unless the geofeed was subsequently updated). In this manner, a content consumer may retrieve a previously created and stored geofeed as it existed when originally created. Also in these implementations, geofeed update module 116 may configure the computer to automatically (and/or based on user input) update the geofeed with newly available content. For example, new content from a content provider may become available after the geofeed was created. Geofeed update module 116 may configure the computer to update the geofeed by including the newly available content with the content that was aggregated when the geofeed was created.

In some implementations, computer 110 may receive a request for a geofeed from a content consumer device 120. The request may include a specification of the geo-location, which may be input via content consumer device 120 using an interface exposed by computer 110. The interface may include a map interface and/or other interface that receives a boundary of the geo-location. The map interface allows the content consumer or other user to designate an outline on the map, zoom in or out of the map, and/or pan the map to specify the geo-location. Other interfaces may include a text input that allows the content consumer or other user to input an address, a geo-coordinate, a locality such as a city, a zip code, a description of a point of interest such as "White House," and/or other information that can specify a geo-location. In some implementations, the geo-location may be calculated based on a current location of a device such as content consumer device 120.

In some implementations, the geo-location may include an altitude and/or orientation that further define a geo-location of interest. In these implementations, the content consumer may request a geofeed having aggregated content relevant to the altitude and/or orientation. For example, the content consumer may request a geofeed having content originating from a particular altitude. The content consumer may also request a geofeed having content that was created with respect to a particular spatial orientation (e.g., "facing Southeast," "Azimuth of 125 degrees," "facing the White House," etc.). In these implementations, the geofeed may include a reference point from which content was created (e.g., videos taken while facing the White House, images of celestial objects viewed from a location at particular angles, etc.).

In some implementations, the request may include a geofeed parameter that specifies content to include with and/or exclude from the geofeed. The geofeed parameters may specify, for example, content providers, content type (e.g., video, audio, etc.), date (e.g., when content was created, modified, published, etc.), demographic information known about content creators, keywords/hashtags included in or associated with the content, and/or other parameter that may be used to further filter (in addition to the geo-location specification) content that should be included (and/or excluded) in a geofeed. The system can also automatically display or "bubble up" social media posts by certain content creators that have been designated by the user via a ranking or tagging system.

The date parameter may specify dates when content was created, modified, published, etc., before a particular date, after a particular date, and/or within a range of dates. A date parameter that specifies content before a particular date may cause a geofeed having historical content from before the particular date. A date parameter that specifies content after a particular date may cause a geofeed having recent content or otherwise content after the particular date. A date parameter that specifies a range of dates (e.g., start-to-end consecutive dates, multiple non-consecutive dates, and/or other plurality of times) may cause a geofeed having content from an event that spans the particular range of dates. As used herein, the term "date" may include any measure of time such as, for example, a month, a day and/or a time. For example, a date parameter may include a particular day of the year and/or a time.

In some implementations, computer 110 may generate a geofeed based on the geo-location specification and/or geofeed parameters. Computer 110 may request or otherwise crawl content that may be relevant to the geo-location from content providers 150. Typically, although not necessarily, computer 110 may request and receive the content via various Provider Application Programming Interfaces ("APIs") 140 (illustrated in FIG. 1 as API 140A, API 140B, . . . , API 140C) exposed by content providers 150. In other instances, computer 110 may simply request and/or receive content from content providers 150 without using an API such as by crawling a website of the provider or otherwise requesting content without an API. Data input to and output from a content provider 150 hereinafter will be described with respect to an API 140 for convenience, although processing may be similarly applied to interfacing with a content provider without using an API.

The various content providers 150 may accept requests using different formats. For example, provider 150A may receive a geo-location specification via a point and radius input while another provider 150B may receive a geo-location specification using a zip code. Yet another provider 150C may receive a geo-location specification using a geographic boundary. As such, computer 110 may normalize the geo-location specification and/or the geofeed parameters so that they conform to APIs 140.

In some implementations, APIs 140 may not take as input one or more geofeed parameters (or a normalized equivalent). In these implementations, computer 110 may use the geofeed parameters to filter the provided content returned from APIs 140. For example, a particular API may not receive as input a date parameter but may provide a date related to the provided content. The date or other information may be provided using meta-data or other information that accompanies or describes the provided content such as Exchangeable Image File format ("EXIF") data. In the foregoing example, computer 110 may receive all content from the particular provider and later filter the received content using the provided date and the date parameter.

The content provided by different content providers may be received in various formats, which may be specific to the content provider. In some implementations, computer 110 may reformat the received content into a uniform format for processing into (or excluding from) a geofeed.

In some implementations, computer 110 may process the content from content providers 140 and aggregate relevant content into a geofeed. Processing may include determining a relevance of the content, filtering the content to remove undesired content, performing a data integrity check, ranking the content, sorting the content, and/or performing other processing that assesses the received content. Computer 110 may aggregate the content into a geofeed. The geofeed may be communicated via a user interface, which may include the same interface used to receive the geo-location.

In some implementations, computer 110 may include or otherwise access one or more databases, which may include a consumer profile database 132 and a provider profile database 134. Consumer profile database 132 may be configured to store information related to a content consumer such as, for example, prior geo-location specifications, prior geofeed parameters, and/or other information related to a content consumer. In some implementations, a geofeed may be stored by the content consumer for later retrieval. Computer 110 may also store a name associated with the geofeed. The content consumer may label or otherwise provide a name for the stored geofeed.

Provider profile database 134 may be configured to store information related to a content provider such as, for example, information used to normalize/reformat inputs to and outputs from content provider. The provider profiles may identify the set of content providers from which the computer aggregates content. For example, each provider may have a corresponding provider profile that is stored in provider profile database 134 and identifiers the provider. In this manner, new providers may be added to the predefined set of content providers by adding a corresponding provider profile.

A provider profile may include, for example, an identification of the provider, an indication of the types of content provided by the provider, translation data that describes how to retrieve the content from the provider (e.g., an API call), and/or other information that describes the provider. For example, an administrator of computer 110 may add an additional content provider 150 by storing rules and/or other intelligence that allows computer 120 to translate requests for content into a format that is compatible with the new content provider. Similarly, rules and other intelligence may be added that allows computer 120 to translate output from the new provider into a format that is compatible with computer 120. In some implementations, computer 120 may register a new provider. During the registration process, the new provider may input the rules, intelligence, and/or other information related to the new provider. In this manner, system 100 is scalable and may easily be configured to add additional providers.

Geofeed database 136 may store content aggregated from content providers 150 (e.g., may cache the content), links to content aggregated from the content providers, geofeed definitions, and/or other information related to geofeeds as described herein.

In some implementations, computer 110 may expose a Geofeed API 111 that allows for integration with other systems such as, without limitation, GIS applications, CRM systems, CMSs. In this manner, one or more computers may interface with computer 110 via Geofeed API 111 to request and receive a geofeed.

Those having skill in the art will recognize that computer 110 and content consumer device 120 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 120. In one implementation, computer 110 and consumer device 120 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The foregoing description of the various components comprising system 100 is exemplary only, and should not be viewed as limiting. The invention described herein may work with various system configurations. For example, the system configuration and various disclosure described in granted U.S. patent application Ser. No. 13/284,455, filed Oct. 28, 2011 and issued as U.S. Pat. No. 8,655,873 on Feb. 18, 2014, entitled "SYSTEM AND METHOD FOR AGGREGATING AND DISTRIBUTING GEOTAGGED CONTENT," which is incorporated by reference herein in its entirety, may be used. Accordingly, more or less of the aforementioned system components may be used and/or combined in various implementations.

Having provided a non-limiting overview of exemplary system architecture 100, the various features and functions enabled by computer 110 will now be explained.

Figure 2:
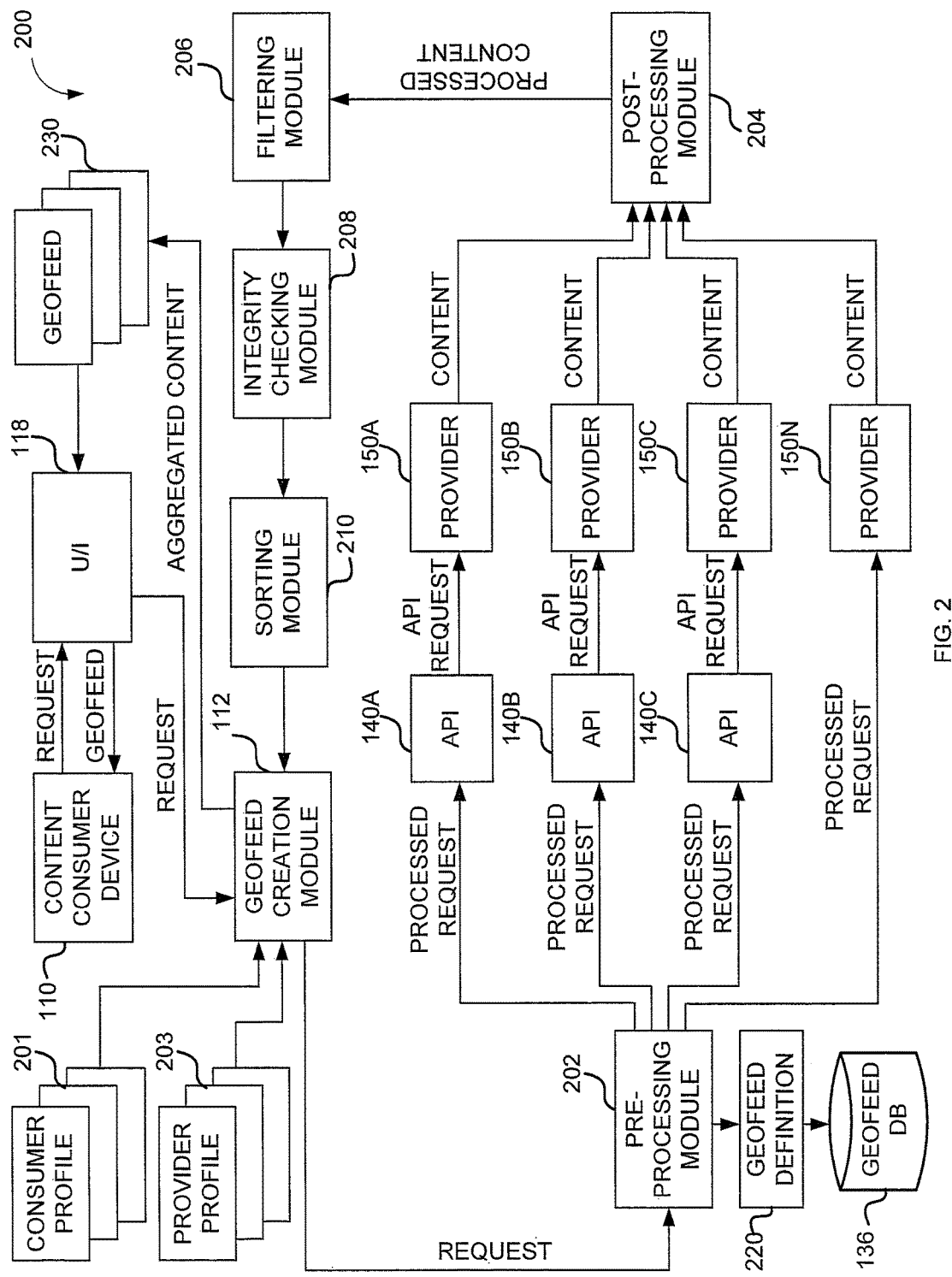
FIG. 2 illustrates a data flow diagram for a system for generating a geofeed, according to an aspect of the invention.

FIG. 2 illustrates a data flow diagram 200 for generating and communicating a geofeed, according to an aspect of the invention. Through various modules, geofeed creation module 112 may generate and communicate a geofeed 230. For example, geofeed creation module 112 may include or otherwise access a pre-processing module 202, a post-processing module 204, a filtering module 206, an integrity checking module 208, and a user interface module 118. Geofeed creation module 112 may obtain various profiles such as a consumer profile (201) that describes a content consumer and a provider profile (203) that describes a content provider.

Geofeed creation module 112 may communicate a user interface via user interface module 118. The user interface may include a web page, an application executing on a mobile device, or other interface that can receive inputs and/or communicate outputs. Although not illustrated in FIG. 2, geofeed creation module 112 may expose an interface that allows application programs to communicate requests and/or receive outputs from geofeed creation module 112. Content consumer device 110 may display a user interface provided by user interface module 118, which a content consumer may use to request a geofeed. The request may include a specification of one or more geo-locations and geofeed parameters such as, for example, providers to include (or exclude), types of content to include (or exclude), and/or other parameters by which to generate a geofeed. Geofeed creation module 112 may receive the request and begin to process the request.

In some implementations, geofeed creation module 112 may retrieve and/or store a consumer profile related to the content consumer in one or more consumer profiles. The consumer profile may include, for example, a prior geofeed request, a prior geofeed, identification of the content consumer such as a name of an individual or organization, and/or other information known about the content consumer. Similarly, geofeed creation module 112 may retrieve and/or store a provider profile related to a content provider. The provider profile may include, for example, various rules that describe accessing content of the provider and/or other information known about the provider such as an identity of the provider and a type of content provided by the provider.

In some implementations, geofeed creation module 112 may use pre-processing module 202 to begin processing the request. Pre-processing module 202 may process the geo-location specification in order to determine the geographically definable location or locations for which the geofeed is requested. Pre-processing module 202 may also parse the geofeed parameters (if any) to determine which providers, types of content, and/or other parameters should be used to generate the requested geofeed. Based on the geofeed parameters, pre-processing module 202 may determine which ones of the content providers 150 from which geofeed creation module 112 receives content should be used. If no geofeed parameters limit providers, pre-processing module 202 may determine that content from all of the content providers 150 to which geofeed creation module 112 has access should be obtained.

In some implementations, pre-processing module 202 may store the geo-location specification, geofeed parameter, and/or other information related to the request as a geofeed definition 220 in a memory such as geofeed database 136. In these implementations, pre-processing module 202 may associate the geofeed to be generated with one or more geofeed identifiers, which may be named using alphanumeric or other characters by the content consumer and/or include numeric identifiers stored by the system.

The geofeed definition may include information that allows geofeed creation module 112 and/or other components of the system to generate a geofeed that was previously requested using the geo-location specification, geofeed parameters, and/or other information related to the geofeed. In this manner, a content consumer or others may store a previously specified geofeed request and later retrieve a geofeed based on the previously specified geofeed request.

For example and without limitation, a content consumer may specify particular coordinates for a city as a geo-location and specify a geofeed parameter that limits aggregated content to include only photos. The content consumer may name the geofeed "favorite city" and pre-processing module 202 may generate a geofeed definition identified by the name "favorite city" and/or other identifier. The content consumer may later obtain a geofeed that includes aggregated photos for the particular city by specifying that the "favorite city" geofeed is requested. In this manner, the content consumer need not re-enter the geo-location for the particular city nor the "photo" geofeed parameter in order to view the geofeed defined by a "favorite city" geofeed definition.

In some implementations, the request itself may be stored as a geofeed definition. In other implementations, the geo-location specification, geofeed parameters, and/or other information from the request may be normalized for input to the various providers 150 prior to being stored as a geofeed definition.

Pre-processing module 202 may determine rules and/or other intelligence for accessing content from providers 150. For example, pre-processing module 202 may obtain this information from the various provider profiles. As would be appreciated, the rules and/or other intelligence of the provider profiles may be hard-coded into pre-processing module 202, implemented as compiled objects, configuration settings, and/or using other techniques that can implement rules.

As illustrated in FIG. 2, providers 150A-C may each expose a respective API 140A-C for accessing (e.g., request and/or receiving) content. Pre-processing module 202 may use a provider profile associated with each provider 150A-C in order to normalize the request so that the request is compatible with each API. For example and without limitation, the request may include a geo-location specification that is an address, while API 140A may take as input a point and radius location for defining a geo-location and API 140B may take as input a zip code for defining the geo-location.

Pre-processing module 202 may normalize the geo-location specification from the request to be compatible with API 140A and API 140B. For example, pre-processing module 202 may normalize the address into a point that defines a geographic center of the address and determine a radius about the center to approximate the geographic region of the address in order to request content from provider 150A using API 140A. On the other hand, pre-processing module 202 may normalize the address into a zip code of which the address is a part in order to request content from provider 150B using API 140B.

In some implementations, a content provider may not expose an API. In these implementations, pre-processor 202 may normalize the request to be compatible with provider 150N. For example, pre-processor 202 may request content from provider 150N directly by crawling a website of provider 150N, executing search queries on a search module of provider 150N and/or using other techniques to access content from provider 150N.

In some instances, the content from providers 150 may be over-inclusive because of the normalization process (e.g., a zip code may return more results than a particular address). The over-inclusive content may be filtered by geofeed generator 122 using filtering module 206 as described in more detail below.

In some implementations, content from providers 150 may be received by geofeed creation module 112 using post-processing module 204. The content may be received via API 140, as would be appreciated. The content from the different providers 150 may be provided in different formats and may include various meta-data and/or other descriptive information that describes the content. As such, post-processing module 204 may normalize the content and/or other descriptive information into a format that is compatible with geofeed creation module 112. In some implementations, the content may include embedded data such as, for example, EXIF data. Post-processing module 204 may extract the embedded data and normalize the extracted data as appropriate. In some implementations, post-processing module 204 may rank the received content. For example, post-processing module 204 may assign a rank, or score, to the received content based on various ranking factors such as, for example, relevance to a specified geo-location, content creator who created the content, content provider who provided the content, and/or other factors that can be used to rank content.

In some implementations, geofeed creation module 112 may use filtering module 206 to filter the received content from providers 150 by removing unwanted ones of the received content. The filtered out content may be omitted from the geofeed. In some implementations, the filtered out content may be retained so that the content consumer may be notified of the filtered out content.

In some implementations, filtering module 206 may filter content based on a sensitivity of the received content. For example, filtering module 206 may omit granular content that may be used to track a location of an individual content creator.

In some implementations, filtering module 206 may filter content based on excess content that may result from normalizing inputs. For example, a geo-location specification that includes an address may be normalized to a zip code input of a particular provider. In this example, the returned content based on the normalized zip code input may be greater than content requested based on the address. As such, filtering module 206 may filter out the extraneous content such as content that is within the zip code but outside the address. Filtering module 206 may determine a location associated with each content and determine whether the location is within the original request (in the foregoing example, within a location specified by the address). In this manner, even if a particular provider provides only an input mechanism that broadly defines a geo-location such as a zip code, filtering module 206 may be used to fine-tune the content to a narrower geo-location such as but not limited to an address, a neighborhood boundary within the zip code, or a building boundary within the zip code or a user defined location.

In some implementations, filtering module 206 may filter content based on geofeed parameters not supported by a particular provider. As described above with respect to pre-processing module 202, geofeed parameters supported by a particular provider will be included in the processed request to an API and/or the particular provider. In this case, the particular provider may perform its own filtering to filter out content based on the supported geofeed parameter. However, if the particular provider does not support the particular geofeed parameter, filtering module 206 may be used filter out the received content from the provider using the unsupported geofeed parameter. In this manner, even if a particular provider does not support a geofeed parameter, geofeed creation module 112 may filter out content based on unsupported geofeed parameter, making the geofeed creation module 112 scalable to include various providers and also support different types of geofeed parameters. The content may be filtered out by comparing information such as meta-data or other information related to the received content with a geofeed parameter. In some implementations, filtering module 206 may filter out content based on rules or other logic from a content consumer. For example, the content consumer may enter a rule that content from a particular content creator should be excluded. Filtering module 206 may obtain the rules or other logic and exclude or otherwise omit received content from the particular content creator based on the rules or other logic.

In some implementations, geofeed creation module 112 may use integrity checking module 208 to determine whether content includes potentially inaccurate information. Geofeed creation module 112 may omit or flag content that is associated with inaccurate information.

In some implementations, integrity checking module 208 may determine whether a geo-location related to provided content is accurately reported by providers 150. For example, when content from a content creator (e.g., a social media user) is not automatically geo-tagged (e.g., by a GPS-enabled camera), a particular provider 150 may use an address associated with the content creator to define a location of where the content was created. When content is not automatically geo-tagged and is created at a location other than the address associated with the content creator, the foregoing behavior of the particular provider 150 may incorrectly identify where the content was created. Integrity checking module 208 may omit or flag such data by determining whether the content has been automatically geo-tagged and, if the content has not been automatically geo-tagged, omit the content from the geofeed. In this manner, a higher accuracy of locations where content is created may be achieved.

In some implementations, integrity checking module 208 may determine whether a time associated with provided content is accurately reported by providers 150. For example, a content creator may upload to provider 150 multiple photos taken several days ago. Provider 150 may erroneously assign a date and time of creation for the photos with the date and time when the photos were uploaded. Integrity checking module 208 may recognize that the multiple photos could not have been created on the same date and time and may flag or omit the content due to this potential errant information.

Not all providers 150 exhibit the foregoing and/or other examples of reporting potentially incorrect information. As such, whether a provider 150 is known to perform these and/or other behaviors that may result in incorrect information may be stored in a provider profile.

In some implementations, geofeed creation module 112 may use sorting module 210 to sort the content. Sorting module 210 may sort the content based on a geofeed parameter (e.g., as requested by the content consumer), rules or other intelligence for sorting the content, and/or other source of sorting instruction. The content may be sorted in various ways such as in reverse chronological order or other chronological sort. The chronology may be based on a publication date, a creation date, and/or other date related to the content.

Geofeed creation module 112 may aggregate the received content, which may or may not be filtered, checked for potential data integrity problems, and/or sorted and generate a geofeed based on the aggregated content. The geofeed may be communicated to the content consumer via the user interface communicated via user interface module 118 and/or other communication channel. Examples of various user interfaces are described with respect to FIGS. 6-8.

In some implementations, the geofeed (e.g., the aggregated content of the geofeed) may be stored in a memory such as geofeed database 136. In these implementations, unlike storing a geofeed definition and retrieving a geofeed "live" from content providers 150 based on the geofeed definition, the stored geofeed may include content that was retrieved at the time that the geofeed was originally created.

In this manner, historic (or past) geofeed content may be obtained that omits any content that may have been added since the geofeed was originally created.

In some implementations, a geofeed may include content that overlaps with one or more other geofeeds. For example, the geofeed may include a geo-location that is at least partially co-extensive with one or more other geo-locations. In some implementations, one geofeed may completely overlap with another geofeed. In some implementations, a request for a geofeed may be compared with other requests for geofeeds to determine whether the geofeeds overlap. If two or more geofeeds overlap, the content already retrieved for a prior geofeed may be used for the overlapping geofeed. In these implementations, for example, a request may not be redundantly made to a content provider for content that has already been retrieved.

Figure 3:
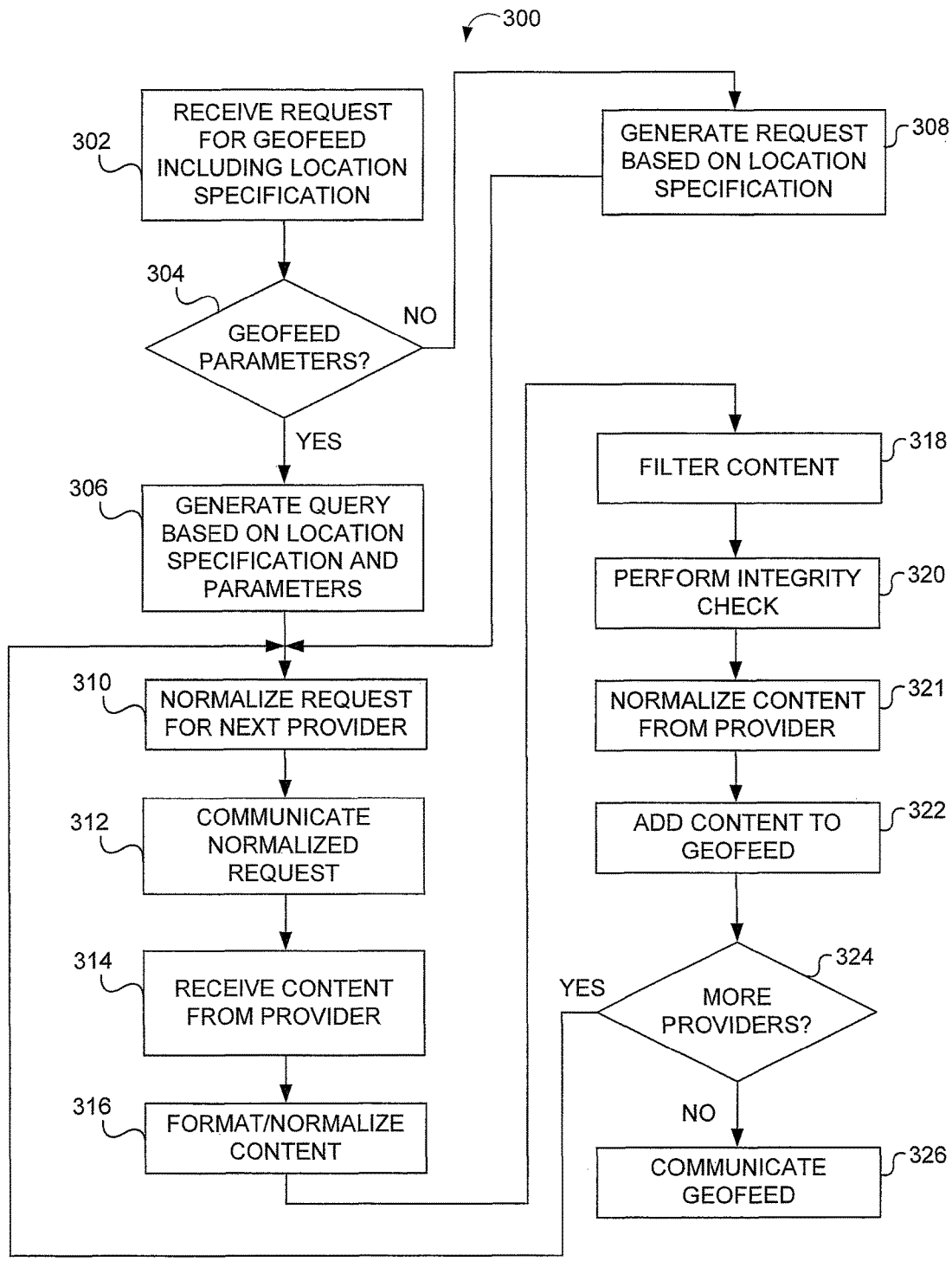
FIG. 3 illustrates a process for generating a geofeed, according to an aspect of the invention.

FIG. 3 illustrates a process 300 for generating a geofeed, according to an aspect of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, process 300 may include receiving a request for a geofeed. The request may include a geo-location specification. In an operation 304, process 300 may include determining whether the request includes a geofeed parameter. If the request includes a geofeed parameter, process 300 may include generating a query based on the geo-location specification and the geofeed parameter in an operation 206. On the other hand, if the request does not include a geofeed parameter, process 300 may include generating a query based on the geo-location specification alone in an operation 308.

In an operation 310, process 300 may include normalizing the query for the next provider from which content is received. In an operation 312, process 300 may include communicating the normalized query to the next provider. In an operation 314, process 300 may include receiving the requested content from the provider. In an operation 316, process 300 may include formatting the received content from the provider into a normalized format. In an operation 318, process 300 may include filtering the received content. In an operation 320, process 300 may include performing a data integrity check on the content. In an operation 321, process 300 may include normalizing the content received from the content provider. In some implementations, the content may be normalized into a common format such that content from different providers outputting content in different formats may be presented in the geofeed using the common format. In some implementations, the original (e.g., not normalized) content may be provided as well.

In an operation 322, the content may be added to the requested geofeed. In an operation 324, process 300 may include determining whether more providers are to be queried for content. If more providers remain, process 300 may return to operation 310, where the request is normalized for the next provider. If no more providers remain, in an operation 326, process 300 may include generating and communicating the geofeed. The geofeed may be communicated via a user interface, which may include presentation interfaces for displaying the geofeed.

Figure 4:
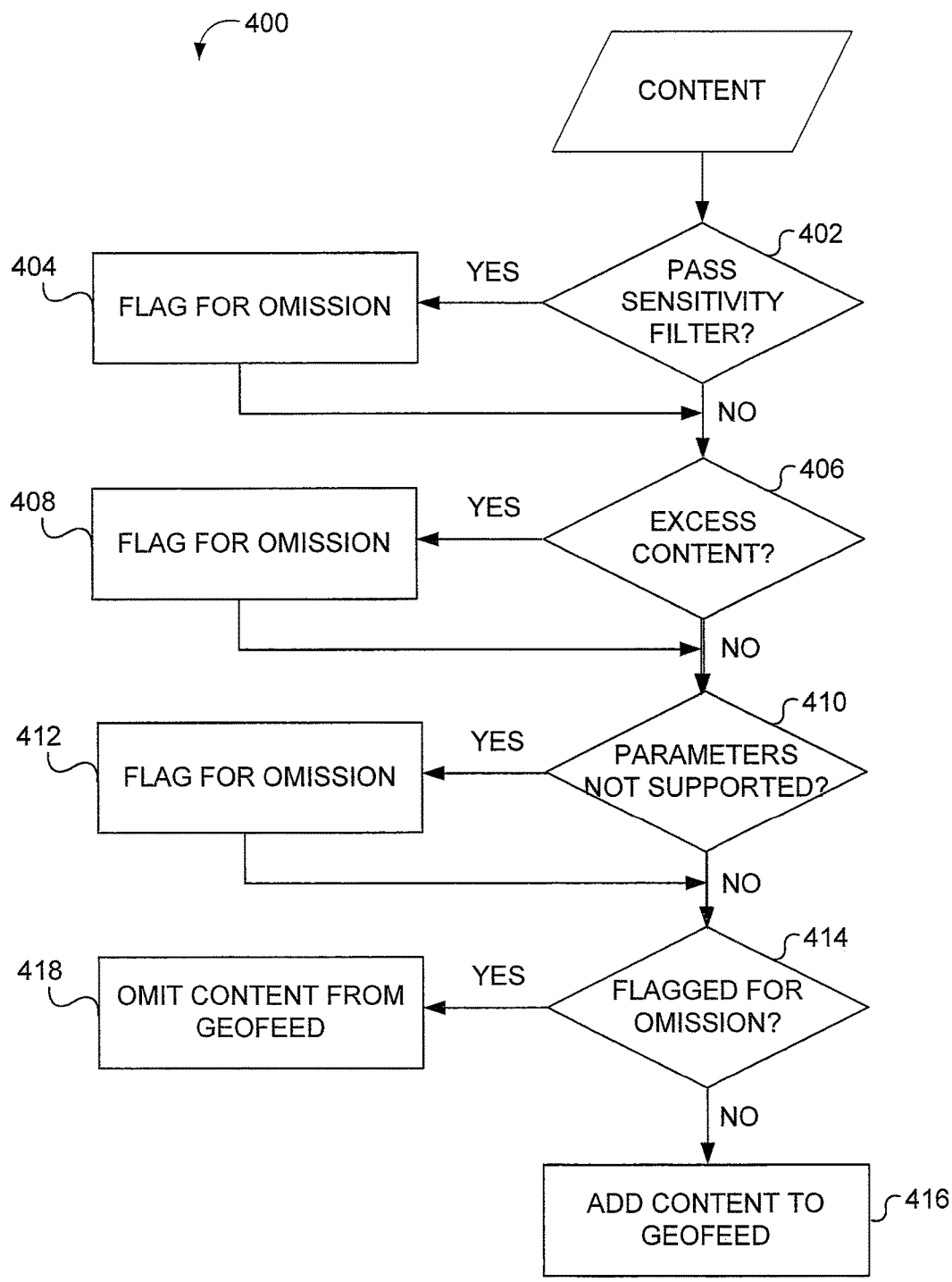
FIG. 4 illustrates a process for filtering content received from content providers, according to an aspect of the invention.

FIG. 4 illustrates a process 318 for filtering content received from content providers, according to an aspect of the invention. In an operation 402, process 318 may include determining whether the content is overly granular. If the content is overly granular, in an operation 404, process 318 may include flagging the overly granular content for omission.

In an operation 406, process 318 may determine whether excess content has been provided. In some implementations, excess content may be provided by content providers as a result of normalizing input parameters. For example, the excess content may include content related to a geo-location outside the originally requested geo-location but within the normalized queried geo-location.

In operation 406, process 318 may include determining a geo-location related to the content provided by the content providers. The geo-location may be determined based on data embedded or included with the content. Process 318 may include comparing the determined geo-location with the geo-location specification from the original request for the geofeed. If the determined geo-location is within the geo-location specification, process 318 may include determining that the content is not excess content that should be filtered. On the other hand, if the determined geo-location is outside the geo-location specification, process 318 may include determining that the content is excess content that should be filtered and may include flagging the excess content for omission in an operation 408.

In an operation 410, process 318 may include determining that geofeed parameters from the original request were not supported by a particular provider. Process 318 may include determining whether to filter the content based on the unsupported geofeed parameters. For example, process 318 may include comparing information related to the content from the particular provider with the geofeed parameters. In particular, if the particular provider does not include an input to filter by content type and the original request included a geofeed parameter that specified to return only photos, process 318 may include determining that the content from the particular provider is a photo and therefore complies with the geofeed parameter. In operation 410, if the content does not comply with the geofeed parameter, process 318 may include flagging the content for omission in an operation 412.

In an operation 414, process 318 may include determining whether the content was flagged for omission. If the content was not flagged for omission, process 318 may include adding the content for potential inclusion into the requested geofeed in an operation 416. If the content was flagged for omission, process 318 may include causing the content to be omitted from (e.g., not added to) the requested geofeed in an operation 418.

Figure 5:
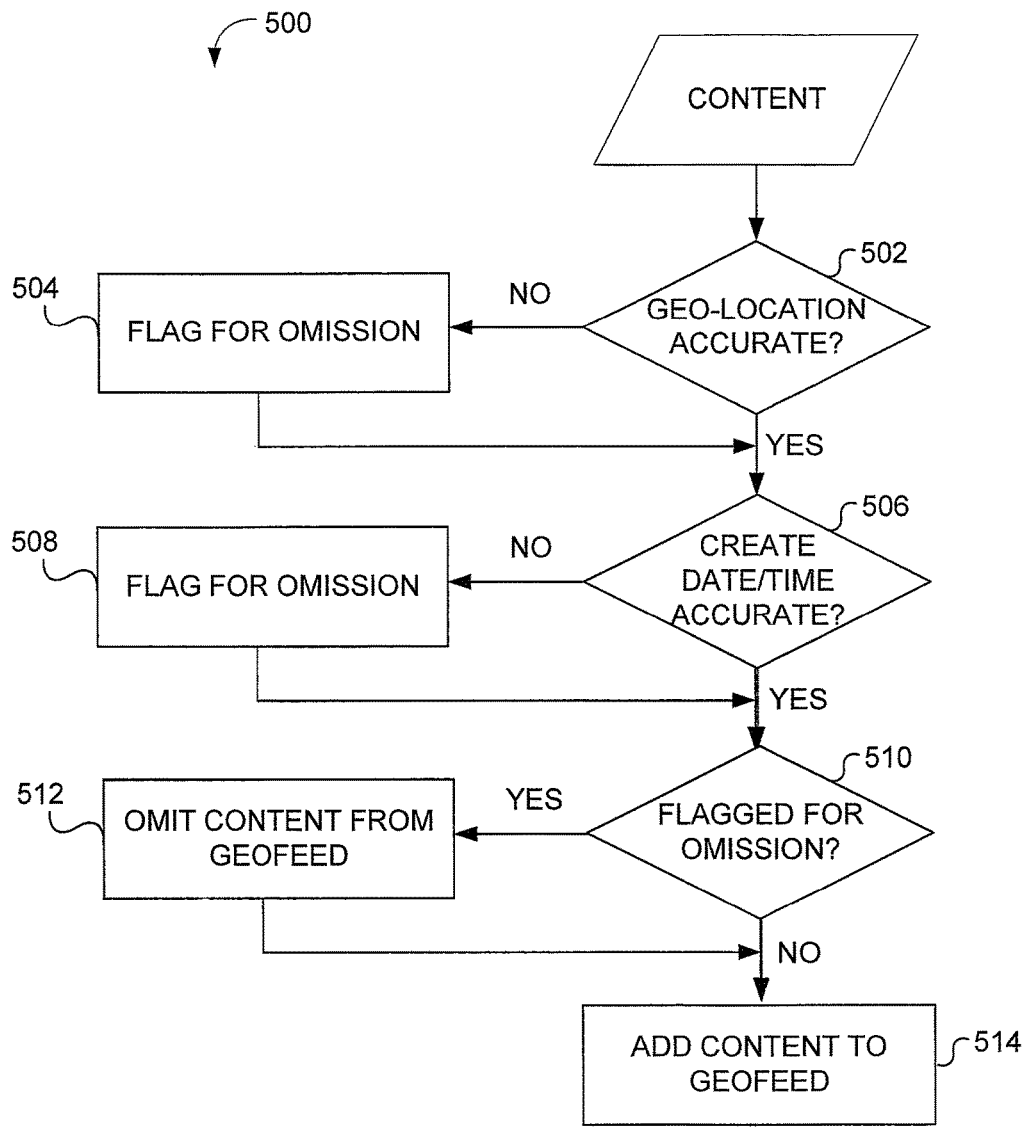
FIG. 5 illustrates a process for performing a data integrity check on content received from content providers, according to an aspect of the invention.

FIG. 5 illustrates a process 320 for performing a data integrity check of content received from content providers, according to an aspect of the invention. In an operation 502, process 320 may include determining whether a geo-location related to provided content is accurately reported by providers 150. For example, process 320 may include determining whether the provided content was automatically geo-tagged with geo-location information. Process 320 may determine that a geo-location provided by the provider 150 is suspect when the provided content is not automatically geo-tagged and when the provider 150 uses an address associated with the content creator to define a location of where the content was created when automatic geo-tagging is not present. If the geo-location information is deemed to be suspect or otherwise likely inaccurate, process 320 may flag the content for omission in an operation 504.

In an operation 506, process 320 may include determining whether a time associated with provided content is accurately reported by providers 150. For example, a content creator may upload to provider 150 multiple photos taken several days ago. Provider 150 may erroneously assign a date and time of creation or other date and time for the photos with the date and time when the photos were uploaded. Process 320 may recognize that the multiple photos could not have been created on the same date and time and may flag them for omission in an operation 508. Dates/times other than the date and time of creation may be integrity-checked as well. These other dates/times may include, for example, a publication date, a date taken, a last edited date, and/or other dates or times related to content.

In an operation 508, process 320 may include determining whether the content was flagged for omission. If the content was not flagged for omission, process 320 may include adding the content for potential inclusion into the requested geofeed in an operation 510. If the content was flagged for omission, process 320 may include causing the content to be omitted from (e.g., not added to) the requested geofeed in an operation 512.

Figure 6:
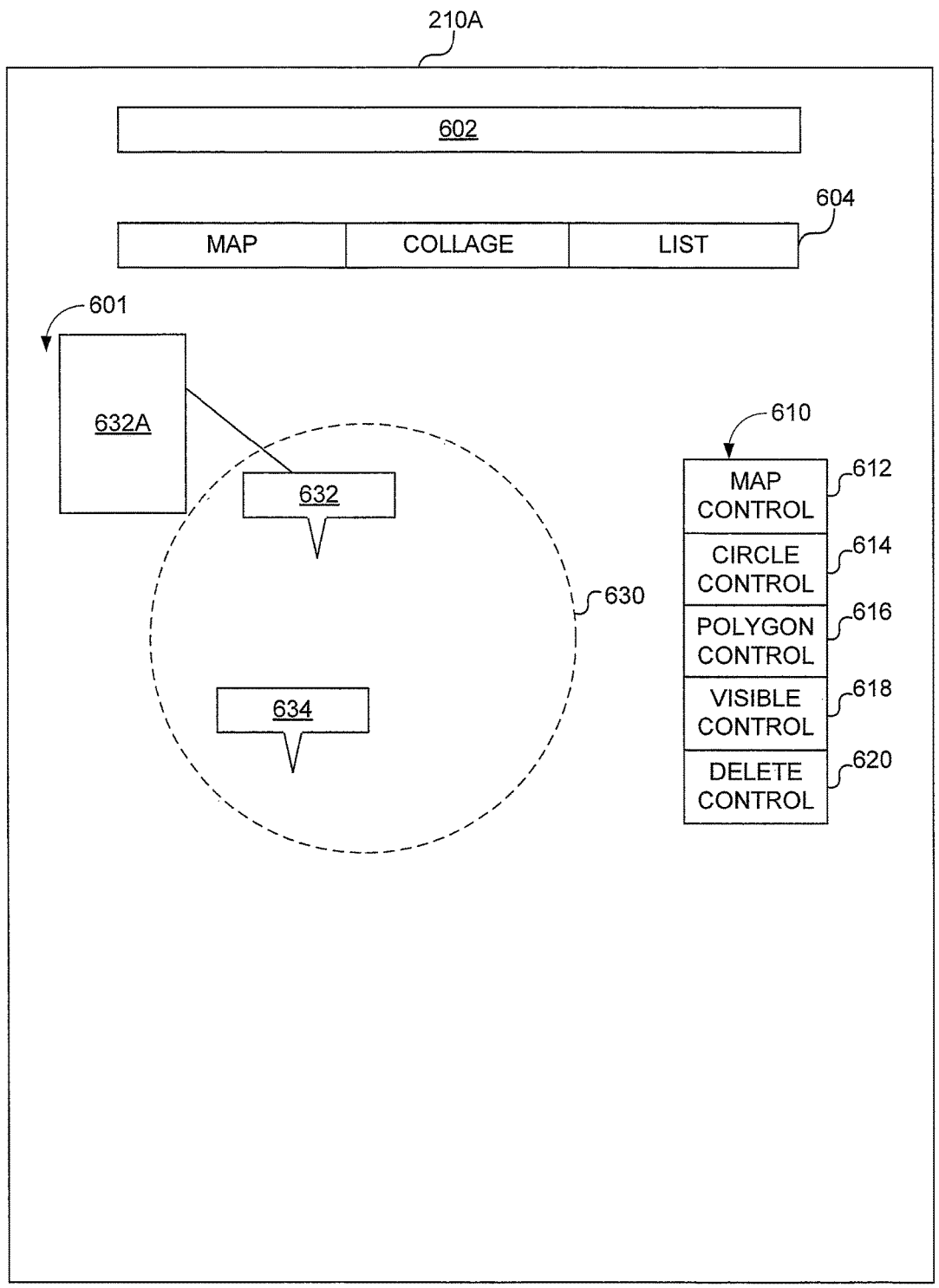
FIG. 6 illustrates a screenshot of an interface for communicating a geofeed, according to an aspect of the invention.

FIG. 6 illustrates a screenshot of an interface 210A for communicating a geofeed, according to an aspect of the invention. The screenshots illustrated in FIG. 6 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 210A and other interfaces described herein may be implemented as a web page communicated from computer 120 to a client, an application such as a mobile application executing on the client that receives generates the interface based on information communicated from computer 120, and/or other interface. Whichever type of interface is used, computer 120 may communicate the data and/or formatting instructions related to the interface to the client, causing the client to generate the various interfaces of FIG. 6 and other drawing figures. Furthermore, computer 120 may receive data from the client via the various interfaces, as would be appreciated.

Figure 8:
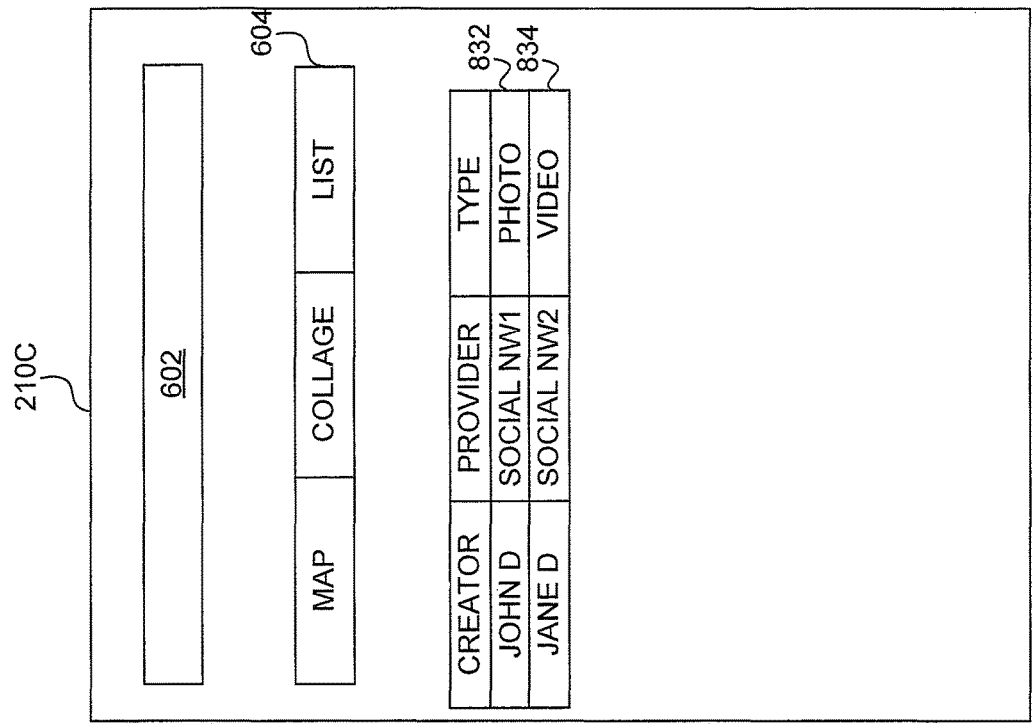
FIG. 8 illustrates a screenshot of an interface for communicating a geofeed, according to an aspect of the invention.
Figure 7:
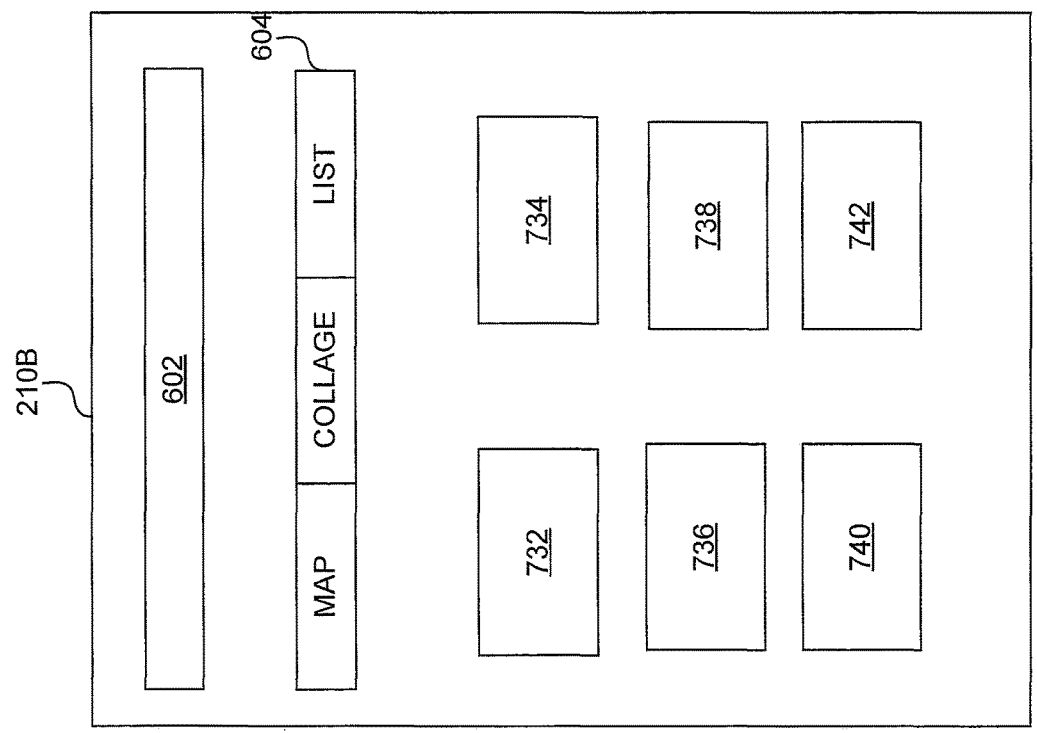
FIG. 7 illustrates a screenshot of an interface for communicating a geofeed, according to an aspect of the invention.

To switch between the various interfaces 210 illustrated in FIGS. 6-8, each interface 210 may include a navigation element 604 having links or other controls that switch between the "MAP" display illustrated by FIG. 6, the "COLLAGE" display illustrated by FIG. 7, and the "LIST" display illustrated by FIG. 8.

Referring to FIG. 6, interface 210A may provide different ways in which to specify a geo-location to request a geofeed. For example, interface 210A may include an input element 602 that receives a geo-location specification. Via input element 602, content consumer may input an address, a place name, and/or other geo-location specification described herein.

Interface 210A may include a map navigation element 610 that allows interaction with a map 601 displayed by interface 210A. Map navigation element 610 may include a map control 612, a search by circle control 614, a search by polygon control 616, a delete control 618, and a search by visible area control 620. Map control 612 may include various map functions such as, for example zooming, panning, and overlaying (e.g., overlaying satellite images onto the map). Search by circle control 614 when selected allows a user to draw a circle on map 601 to specify a geo-location of interest. Search by Polygon control 616 when selected allows the user to draw a polygon or other non-circular shape to specify a geo-location of interest.

In some implementations, multiple circular and/or non-circular shapes may be drawn to specify locations of interest on map 601. Delete control 618 when selected may delete the circles, polygons, and/or other shapes drawn on the map. Search by visible area control 620 when selected allows the user to specify a geo-location of interest based on what is currently displayed by map 601.

As illustrated, a circle 630 having a radius and center (not illustrated) is displayed that indicates a boundary of a geofeed. User interface 210A may transform the circle 630 (or other non-circle shape) into coordinates of map 601 onto which circle 630 is overlayed. For example, user interface 210 may determine latitude and longitude coordinates corresponding to the center of circle 630 and a distance corresponding to a radius of circle 630. User interface 210A may communicate the coordinates and distance to computer 120 to request a geofeed bounded by a geo-location defined by circle 630. In some implementations, computer 120 may transform circle 630 into coordinates. In these implementations, user interface 210 may communicate information related to map 601 and circle 630 so that computer 120 may transform circle 630 into coordinates.

In implementations where the visible area of the map 601 is used to specify the geo-location, the boundary of the geofeed includes the visible area of the map 601. Whichever geo-location specification is used, computer 120 may generate or obtain a geofeed based on the geo-location specification. Computer may communicate the geofeed to user interface 210 for display. The geofeed includes content that is relevant to the geo-location specification. The content may include location information for presentation on map 601. For example, user interface 210A may overlay coordinates of the content from the geofeed onto map 601 using an appropriate coordinate transform.

The geofeed as illustrated includes content indicators 632 and 634, which provide graphical indicia of aggregated content of the geofeed. The content may be provided from different or the same content provider. Content 632 and 634 may each include an icon, a logo, and/or other identifying indicia that indicates the source of the content and/or a type of content. As illustrated, when content indicator 632 is selected (e.g., moused over, clicked, touched, or otherwise interacted with) interface 210A may cause content detail element 632A to appear. Content detail element 632A may include information related to the content such as, for example, the content itself such as video, photo, audio, text, etc., a content creator (e.g., social media user who posted the content), an identification of the content provider that provided the content, a time associated with the content (e.g., create time, publication time, etc.), a location where the content was created (e.g., address, geo-coordinates, etc.), and/or other information known or determined about the content. In some implementations, the information from content detail element 632A may be included within the location indicators 632.

FIG. 7 illustrates a screenshot of an interface 210B for communicating a geofeed, according to an aspect of the invention. Referring to FIG. 7, interface 210B may include an input element 602 that receives a geo-location specification as described with respect to interface 210A.

Interface 210B may include a "COLLAGE" view that includes content elements 732, 734, 736, and 738. The content elements may each include content that was aggregated into the geofeed. Content elements 732, 734, 736, and 738 may include similar information displayed by content indicators 632 and 634 and/or content detail element 632A described with respect to interface 210A. For example, one or more content elements 732, 734, 736, and 738 may include, for example, the content itself such as video, photo, audio, text, etc., a content creator (e.g., social media user who posted the content), an identification of the content provider that provided the content, a time associated with the content (e.g., create time, publication time, etc.), a location where the content was created (e.g., address, geo-coordinates, etc.), and/or other information known or determined about the content.

FIG. 8 illustrates a screenshot of an interface 210C for communicating a geofeed, according to an aspect of the invention. Referring to FIG. 8, interface 210C may include an input element 602 that receives a geo-location specification as described with respect to interface 210A.

Interface 210C may include a "LIST" view that includes content elements 832 and 834 listed in tabular form. The content elements may each include content that was aggregated into the geofeed. Content elements 832 and 834 may include information displayed by content indicators 632 and 634 and/or content detail element 632A described with respect to interface 210A. In some implementations, the "LIST" view may communicate the geofeed to the requestor in a compact UI format or for electronic data transfer such as a Javascript Object Notation list (JSON), RSS (and GeoRSS, ATOM), or comma separated values.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for obtaining, storing and communicating social media content items relating to a geographically definable location, the method being implemented in a computer having one or more physical processors programmed with computer program instructions that, when executed by the one or more physical processors, program the computer to perform the method, the method comprising:

formatting, by the computer, a first request for social media content items specifically for a first social media content provider;

formatting, by the computer, a second request for social media content items specifically for a second social media content provider;

transmitting, by the computer, the first request to the first social media content provider via a network;

transmitting, by the computer, the second request to the second social media content provider via the network;

receiving, by the computer, a first set of social media content items from the first social media content provider responsive to the first request, wherein the first set of social media content items are related to the geographically definable location;

receiving, by the computer, a second set of social media content items from the second social media content provider responsive to the second request, wherein the second set of social media content items are related to the geographically definable location;

storing, by the computer, content in a database accessible to the computer, wherein the content comprises at least the first set of social media content items and the second set of social media content items;

receiving, by the computer, a request for social media content items relating to the geographically definable location;

obtaining, by the computer, responsive to the request, at least a portion of the content from the database; and causing, by the computer, the portion of the content to be communicated via the network.

2. The method of claim 1, the method further comprising:

obtaining, by the computer, responsive to the request, a third set of social media content items from the first social media content provider, wherein the third set of social media content items is communicated via the network along with or separate from the portion of the content.

3. The method of claim 1, wherein storing the content in the database comprises:

storing, by the computer, in the database, a link to at least some of the content, wherein obtaining the portion of the content comprises:

retrieving, by the computer, the portion of the content via the link stored in the database.

4. The method of claim 1, wherein causing the portion of the content to be communicated comprises:

spatially arranging, by the computer, the portion of the content on a map display.

5. The method of claim 4, the method further comprising:

determining, by the computer, one or more locations related to the portion of the content, wherein the one or more locations related to the portion of the content is within the geographically definable location, wherein spatially arranging the portion of the content comprises:

arranging, by the computer, the portion of the content based on the one or more locations related to the portion of the content.

6. The method of claim 5, wherein determining the one or more locations comprises:

extracting, by the computer, one or more automatically generated geotags from the portion of the content.

7. The method of claim 1, the method further comprising:

filtering, by the computer, the content to remove undesirable content items prior to causing the portion of the content to be communicated.

8. The method of claim 1, the method further comprising:

performing, by the computer, a data integrity check of the content;

determining, by the computer, whether the content passes the data integrity check; and removing, by the computer, content that fails the data integrity check prior to causing the portion of the content to be communicated.

9. The method of claim 1, wherein receiving the request for social media content items relating to the geographically definable location comprises:

receiving, by the computer, one or more geofeed parameters used to filter in or out the portion of the content from the content.

10. The method of claim 1, the method further comprising:

storing, by the computer, the portion of the content for later retrieval.

11. The method of claim 1, wherein formatting the first request for social media content items specifically for the first social media content provider comprises:
   accessing, by the computer system, a stored first content provider profile comprising a first input format rule that describes how to request content from the first social media content provider, wherein the first request for social media content items is formatted based on the first input format rule.

12. The method of claim 1, wherein the first request comprises a first specification of the geographically definable location in a first format, and wherein formatting the first request for social media content items specifically for the first social media content provider comprises:
   generating, by the computer system, a second specification of the geographically definable location in a second format suitable for requesting content from at least the first social media content provider, wherein the formatted first request includes the second specification of the geographically definable location in the second format.

13. The method of claim 1, wherein the portion of the content excludes at least content items from the second social media content providers based on the request.

14. A computer system for obtaining, storing and communicating social media content items relating to a geographically definable location, the system comprising:
   one or more physical processors programmed with computer program instructions that, when executed by the one or more physical processors, program the one or more physical processors to:
      format a first request for social media content items specifically for a first social media content provider;
      format a second request for social media content items specifically for a second social media content provider;
      transmit the first request to the first social media content provider via a network;
      transmit the second request to the second social media content provider via the network;
      receive a first set of social media content items from the first social media content provider responsive to the first request, wherein the first set of social media content items are related to the geographically definable location;
      receive a second set of social media content items from the second social media content provider responsive to the second request, wherein the second set of social media content items are related to the geographically definable location;
      store content in a database accessible to the computer, wherein the comprises at least the first set of social media content items and the second set of social media content items;
      receive a request for social media content items relating to the geographically definable location;
      obtain, responsive to the request, at least a portion of the content from the database; and
      cause the portion of the content to be communicated via the network.

15. The system of claim 14, wherein the one or more processors are further programmed to:
   obtain, responsive to the request, a third set of social media content items from the first social media content provider, wherein the third set of social media content items is communicated via the network along with or separate from the portion of the content.

16. The system of claim 14, wherein to store the content in the database, the one or more processors are further programmed to:
   store, in the database, a link to at least some of the content, wherein to obtain the portion of the content, the one or more processors are further configured to:
   retrieve the portion of the content via the link stored in the database.

17. The system of claim 14, wherein to cause the portion of the content to be communicated, the one or more processors are further programmed to:
   spatially arrange the portion of the content on a map display.

18. The system of claim 17, wherein the one or more processors are further programmed to:
   determine one or more locations related to the portion of the content, wherein the one or more locations related to the portion of the content is within the geographically definable location, wherein to spatially arrange the portion of the content, the one or more processors are further configured to:
   arrange the portion of the content based on the one or more locations related to the portion of the content.

19. The system of claim 18, wherein to determine the one or more locations, the one or more processors are further programmed to:
   extract one or more automatically generated geotags from the portion of the content.

20. The system of claim 14, wherein the one or more processors are further programmed to:
   filter the content to remove undesirable content items prior to causing the portion of the content to be communicated.

21. The system of claim 14, wherein the one or more processors are further programmed to:
   perform a data integrity check of the content;
   determine whether the content passes the data integrity check; and
   remove content that fails the data integrity check prior to causing the portion of the content to be communicated.

22. The system of claim 14, wherein to receive the request for social media content items relating to the geographically definable location, the one or more processors are further programmed to:
   receive one or more geofeed parameters used to filter in or out the portion of content from the content.

23. The system of claim 14, wherein the one or more processors are further programmed to:
   store the portion of the content for later retrieval.

24. The system of claim 14, wherein to format the first request for social media content items specifically for the first social media content provider, the one or more processors are further programmed to:
   access a stored first content provider profile comprising a first input format rule that describes how to request content from the first social media content provider, wherein the first request for social media content items is formatted based on the first input format rule.

25. The system of claim 14, wherein the first request comprises a first specification of the geographically definable location in a first format, and wherein to format the first request for social media content items specifically for the first social media content provider, the one or more processors are further programmed to:
   generate a second specification of the geographically definable location in a second format suitable for requesting content from at least the first social media content provider, wherein the formatted first request includes the second specification of the geographically definable location in the second format.

26. The system of claim 14, wherein the portion of the content excludes at least content items from the second social media content providers based on the request.

* * * * *